United States Patent
Lee et al.

(10) Patent No.: US 9,134,846 B2
(45) Date of Patent: Sep. 15, 2015

(54) IMAGE DISPLAY APPARATUS AND METHOD OF CONTROLLING THE SAME

(71) Applicant: LG ELECTRONICS INC., Seoul (KR)

(72) Inventors: Cheonhee Lee, Seoul (KR); Dongwon Choi, Seoul (KR); Sunjung Hwang, Seoul (KR); Namhun Kim, Seoul (KR); Junghoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/043,235

(22) Filed: Oct. 1, 2013

(65) Prior Publication Data

US 2014/0267097 A1    Sep. 18, 2014

(30) Foreign Application Priority Data

Mar. 15, 2013  (KR) .......................... 10-2013-0028248

(51) Int. Cl.
*G06F 3/041* (2006.01)

(52) U.S. Cl.
CPC ............ *G06F 3/0416* (2013.01); *G06F 3/0412* (2013.01)

(58) Field of Classification Search
CPC .......... G09G 2354/00; G09G 2380/02; G09G 2340/0407
USPC .......... 345/173, 172, 175, 204, 156; 313/511, 313/483, 500, 501, 502, 503, 504, 505, 506, 313/510, 512
See application file for complete search history.

(56) References Cited

U.S. PATENT DOCUMENTS

| | | | | |
|---|---|---|---|---|
| 5,889,568 | A * | 3/1999 | Seraphim et al. | 349/73 |
| 6,262,696 | B1 * | 7/2001 | Seraphim et al. | 345/1.3 |
| 7,808,550 | B2 * | 10/2010 | Misawa | 348/373 |
| 8,810,627 | B1 * | 8/2014 | Cho et al. | 348/38 |
| 2005/0280732 | A1 * | 12/2005 | Misawa | 348/333.06 |
| 2010/0011291 | A1 | 1/2010 | Nurmi | |
| 2011/0095975 | A1 * | 4/2011 | Hwang et al. | 345/156 |
| 2011/0183722 | A1 | 7/2011 | Vartanian | |
| 2012/0212433 | A1 | 8/2012 | Lee et al. | |
| 2012/0329528 | A1 | 12/2012 | Song | |
| 2013/0002133 | A1 * | 1/2013 | Jin et al. | 313/511 |
| 2013/0208135 | A1 * | 8/2013 | Han et al. | 348/211.9 |
| 2013/0342439 | A1 * | 12/2013 | Kwack et al. | 345/156 |

FOREIGN PATENT DOCUMENTS

KR    10-2012-0095019 A    8/2012

* cited by examiner

*Primary Examiner* — Olga Merkoulova
(74) *Attorney, Agent, or Firm* — Birch, Stewart, Kolasch & Birch, LLP

(57) ABSTRACT

An image display apparatus includes a display defined by a front surface for outputting screen information and a rear surface opposite to the front surface, and a bezel part formed along edges of the display, wherein the display includes a plane portion configured to output at least part of the screen information, and at least one bent portion integrally formed with the plane portion and bent from an edge of the plane portion by a preset angle, the at least one bent portion outputting at least one of a part of the screen information and a preset image.

16 Claims, 19 Drawing Sheets

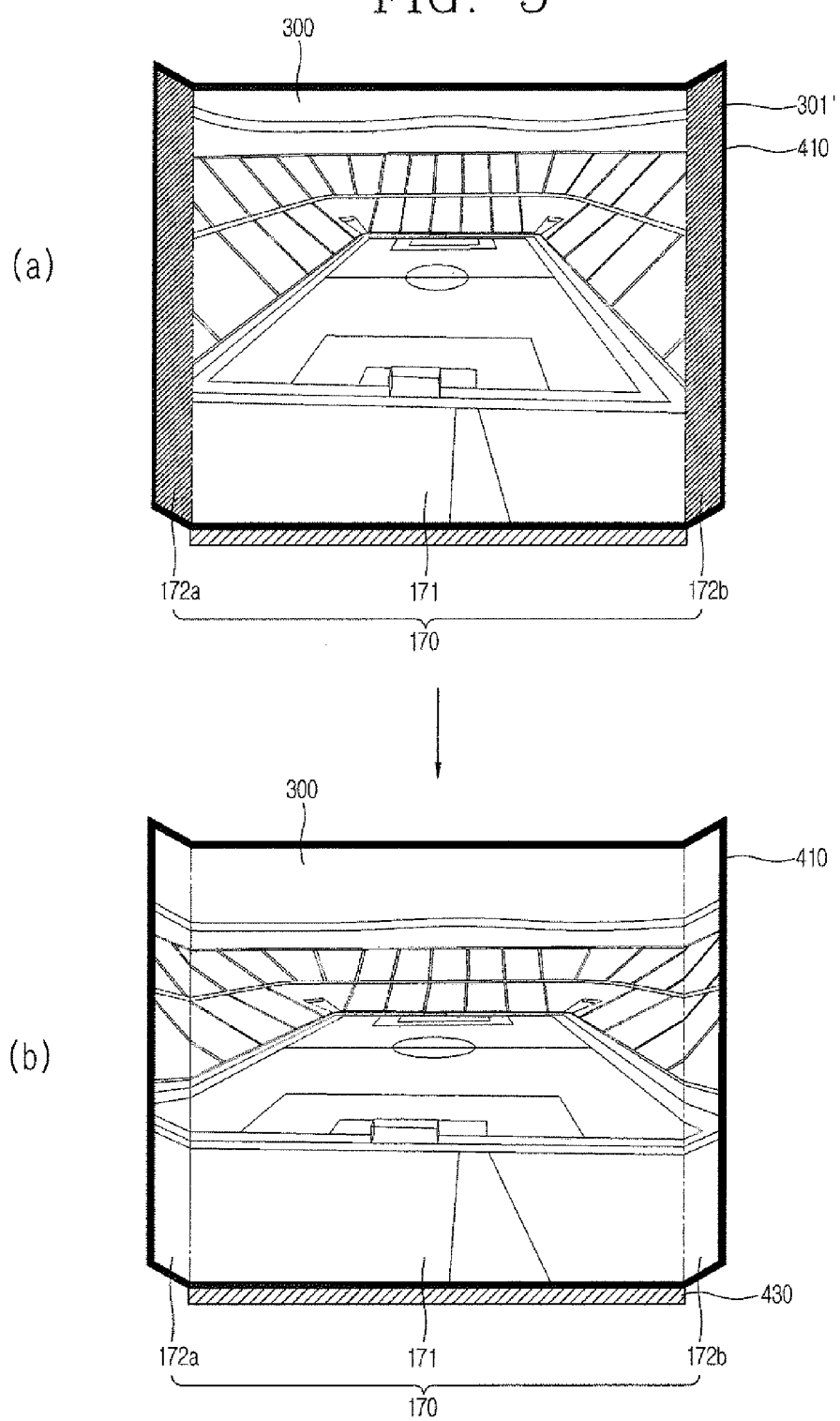

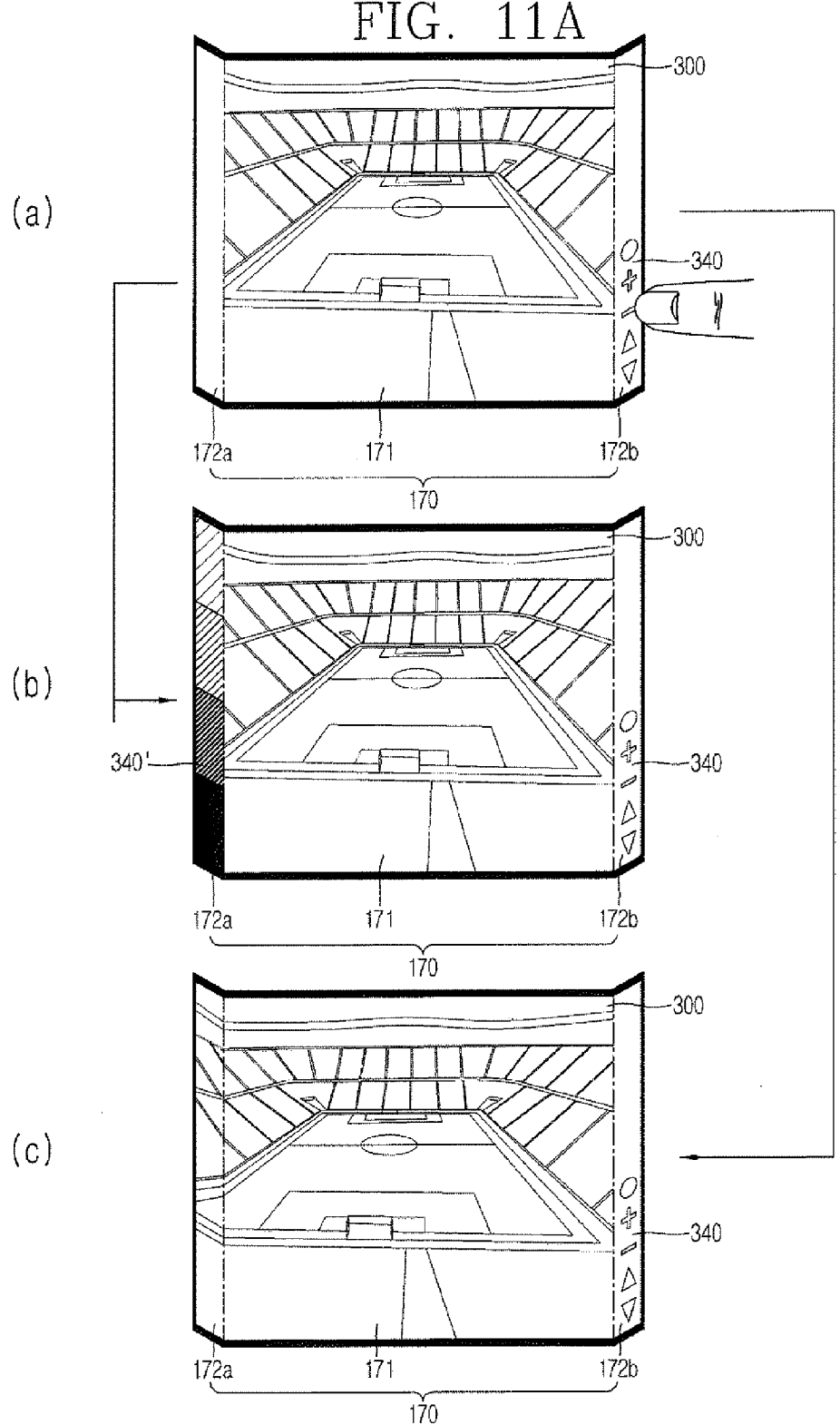

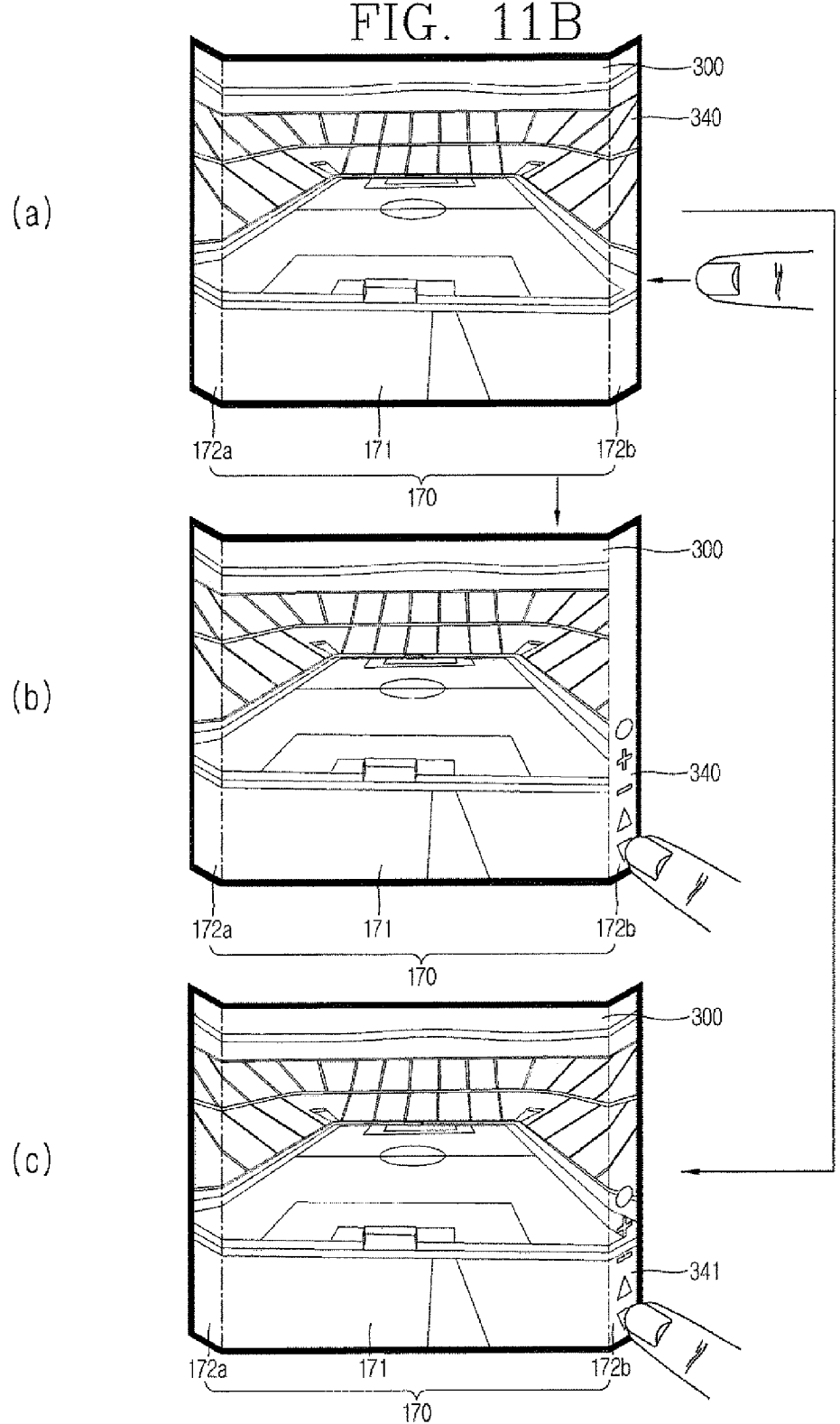

FIG. 13A
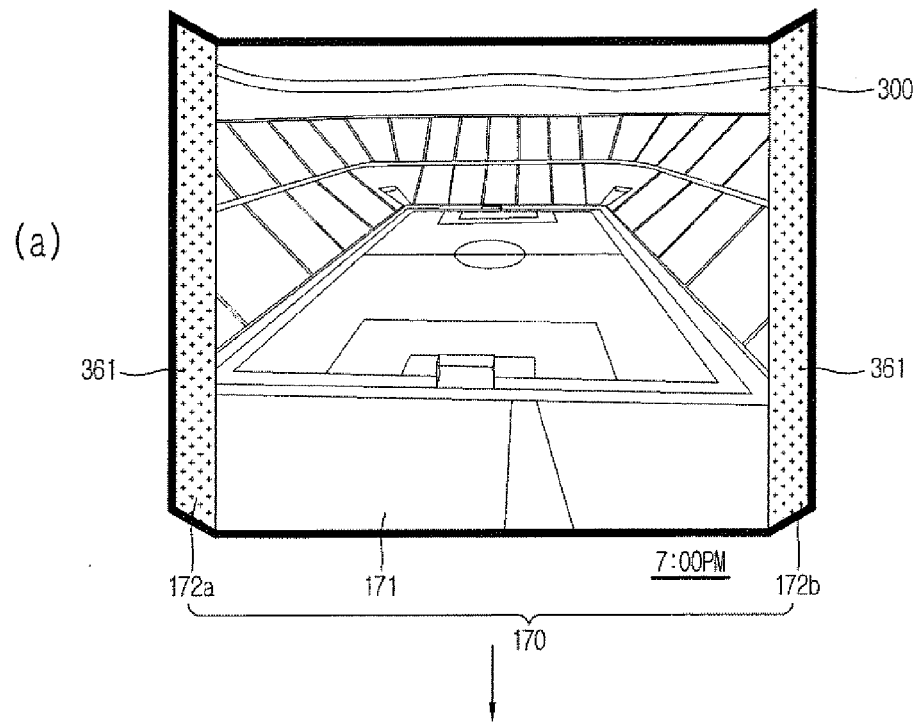
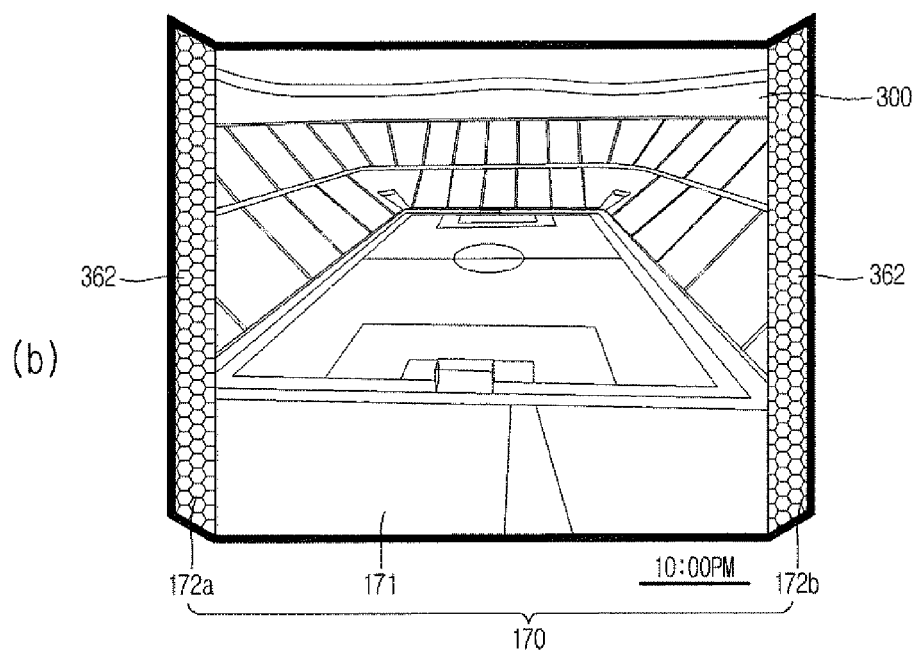

FIG. 13B
(a) 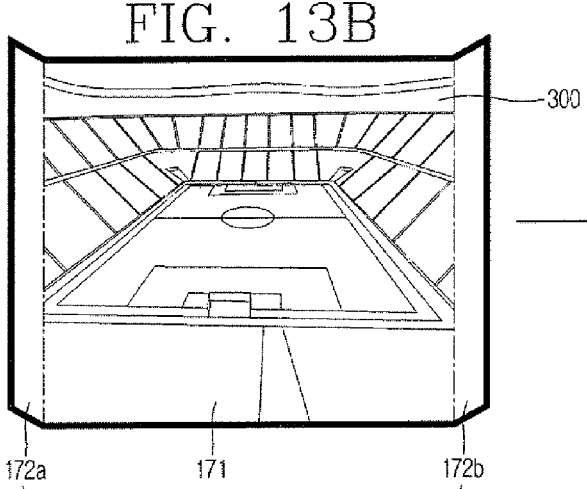
(b) 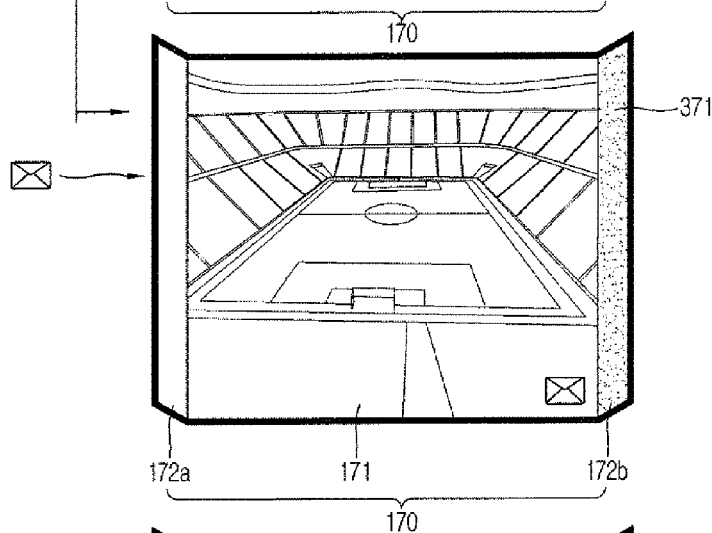
(c) 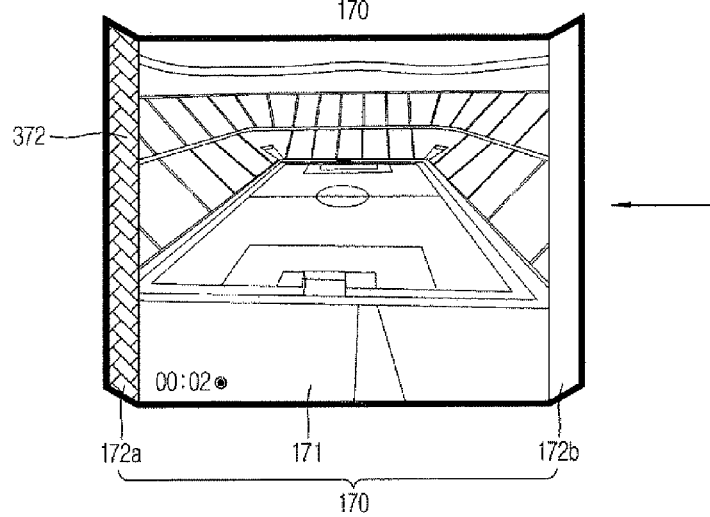

FIG. 14
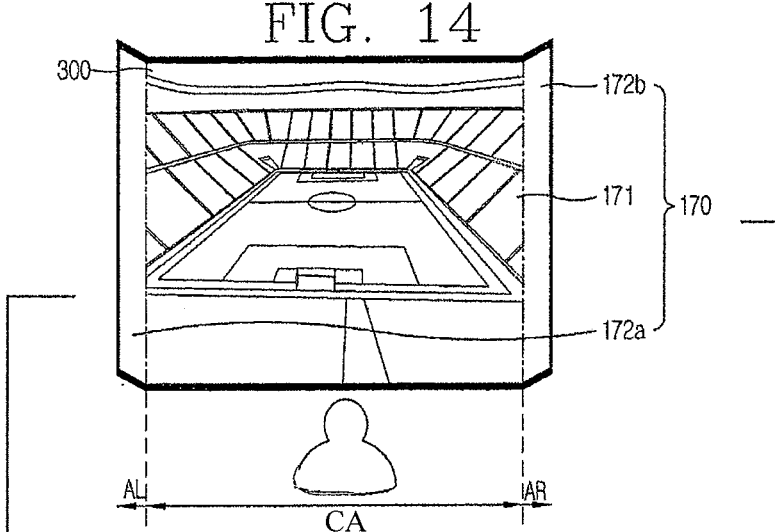
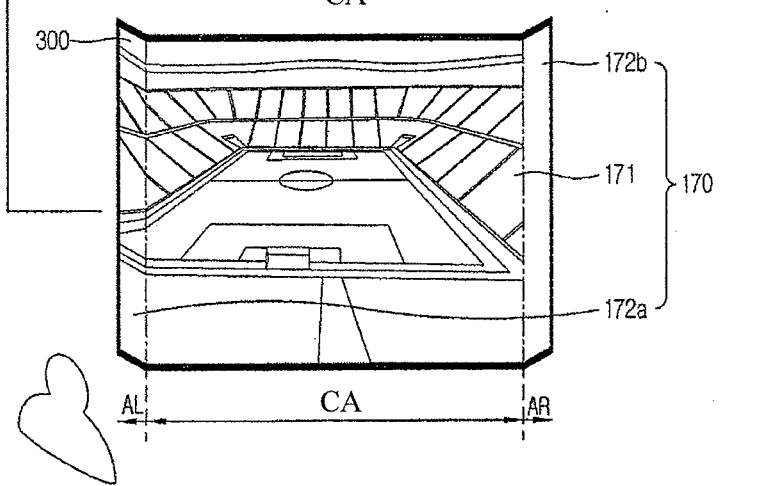
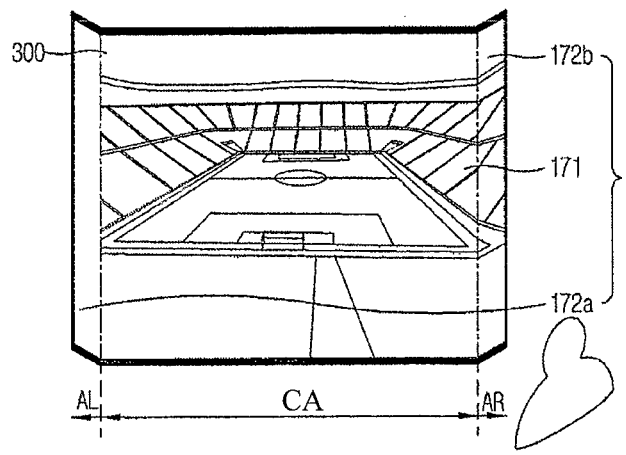

IMAGE DISPLAY APPARATUS AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2013-0028248, filed in Republic of Korea on Mar. 15, 2013, the contents of which are incorporated by reference herein in its entirety.

BACKGROUND OF THE INVENTION

1. Field of the Invention

This specification relates to an image display apparatus for outputting a video and a method for controlling the same.

2. Background of the Invention

In general, a video (image) display apparatus may include a display to output a video and a bezel to fix the display and define an appearance. To provide a video with more improved quality, area and thickness of the display may increase. This may disadvantageously cause an increase in a thickness of the bezel for supporting the thickness-increased display.

Users who receive videos on image display apparatuses are also interested in display quality of video and elegance of an appearance of the image display apparatus. Accordingly, to enhance visual attraction in view of design of the image display apparatus, studies on varying physical shapes of the bezel and the display have recently been conducted.

SUMMARY OF THE INVENTION

Therefore, an aspect of the detailed description is to provide an image display apparatus having a display in a shape whose edge is bent.

To achieve these and other advantages and in accordance with the purpose of this specification, as embodied and broadly described herein, there is provided an image display apparatus including a display defined by a front surface for outputting screen information and a rear surface opposite to the front surface, and a bezel part formed along edges of the display, wherein the display may include a plane portion configured to output at least part of the screen information, and at least one bent portion integrally formed with the plane portion and bent from an edge of the plane portion by a preset angle, the at least one bent portion outputting at least one of a part of the screen information and a preset image.

In accordance with one embodiment of the present disclosure, a front surface of the bent portion may be a curved surface or a flat surface.

In accordance with one embodiment of the present disclosure, the apparatus may further include a case connected to the bezel part and covering the rear surface of the display, and a fixing unit protruding from the case to fix the image display apparatus. The bent portion may be bent toward the rear surface of the display, and a distance from the plane portion to an end of the fixing unit may be the same as a distance from the plane portion to an edge of the bent portion.

In accordance with one embodiment of the present disclosure, a width of the bent portion may be less than ⅙ of a width of the plane portion.

In accordance with one embodiment of the present disclosure, the apparatus may further include a controller configured to receive a control command input by a user, and configured to control the display to output a control image corresponding to the control command, and an audio output unit configured to output sound, wherein the controller may control the display to output a control image corresponding to the sound on the bent portion.

In accordance with one embodiment of the present disclosure, the control image corresponding to the sound may be output in a different shape according to the volume of the sound.

In accordance with one embodiment of the present disclosure, the controller may restrict the output of the control image on the bent portion in a mute state that the sound output is restricted.

In accordance with one embodiment of the present disclosure, the apparatus may further include a controller configured to receive a control command input by a user, and configured to control the display to output a control image corresponding to the control command, and a microphone configured to sense a user's voice for controlling the display, wherein the controller may control the display to output the control image on the bent portion based on the voice.

In accordance with one embodiment of the present disclosure, the plane portion may be formed by an upper edge, a lower edge and left and right edges, and the bent portion may be formed on the lower edge.

In accordance with one embodiment of the present disclosure, the apparatus may further include a touch sensing unit formed in the bent portion and configured to sense a user's touch input. Here, the controller may control the display to output at least one graphic image, to which a touch input being applied, on the bent portion.

In accordance with one embodiment of the present disclosure, the apparatus may further include a controller configured to receive a control command input by a user, and control the display to output a control image corresponding to the control command, and a sensing unit formed adjacent to the display and configured to sense a user's location based on the display. The controller may control the display to output the screen information on at least one of the at least one bent portion and the plane portion based on the user's location sensed by the sensing unit.

In accordance with one embodiment of the present disclosure, the apparatus may further include a distance sensing unit formed in the display and configured to sense a distance with the user. Here, the controller may control the display to output the graphic image on the bent portion when the distance sensing unit senses that the user is located within a preset range.

In accordance with one embodiment of the present disclosure, the apparatus may further include a controller configured to receive a control command input by a user, and control the display to output a control image corresponding to the control command, and a distance sensing unit formed in the display and configured to sense a distance with a user. Here, when a part of the screen information is output on the bent portion, the controller may control the display to output the control image on the bent portion if a distance with the user is shorter than a preset first distance.

In accordance with one embodiment of the present disclosure, the controller may control the display to restrict the output of the screen information on the plane portion when the distance with the user is shorter than a preset second distance.

In accordance with one embodiment of the present disclosure, the apparatus may further include a controller configured to receive a control command input by a user, and control the display to output a control image corresponding to the control command. Here, the controller may control the display to output the control image according to an operation executed based on a preset time.

In accordance with one embodiment of the present disclosure, the apparatus may further include a controller configured to receive a control command input by a user and control the display to output a control image corresponding to the control command, and a wireless communication unit configured to receive a wireless signal. Here, the controller may control the display to output the control image on the bent portion when a wireless signal is received through the wireless communication unit.

To achieve the above aspect of the present disclosure, there is provided a screen-division image display apparatus including a plurality of displays each having a bent portion formed by bending one area of an edge of the display, the plurality of displays outputting a plurality of divided images of screen information, an adhesive member configured to attach surfaces of the bent portions of the plurality of displays, the surfaces facing each other, and a controller configured to control the plurality of displays to output the plurality of divided images.

In accordance with one embodiment of the present disclosure, the bent portion may have a curved surface with a preset curvature, and the controller may compensate for a scaling value of the divided image output on the curved surface.

To achieve the above aspect of the present disclosure, there is provided a control method for an image display apparatus including outputting screen information on a display, the display having a plane portion and a bent portion bent from an edge of the plane portion by a preset angle, and converting a part of the screen information output on the bent portion into a control image based on an externally input control command.

In accordance with the present disclosure, when an image display apparatus is installed outside with a display which includes a bent portion on an edge thereof, the image display apparatus may have more improved aesthetic appearance. For a screen-division image display apparatus using a plurality of displays, an exposed area of an attached portion may be minimized, thereby outputting screen information with improved display quality.

Also, with outputting a control image on the bent portion based on a control command for controlling the image display apparatus, more information may be provided simultaneously with screen information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a conceptual view illustrating a control method of outputting a video in accordance with one exemplary embodiment;

FIGS. 11A and 11B are conceptual views illustrating a control method for an image display apparatus according to a touch sensing function;

FIGS. 13A and 13B are conceptual views illustrating a control method for an image display apparatus according to a notification function;

FIG. 14 is a conceptual view illustrating a control method of an output area based on a user's location.

DETAILED DESCRIPTION OF THE INVENTION

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Figure 1:
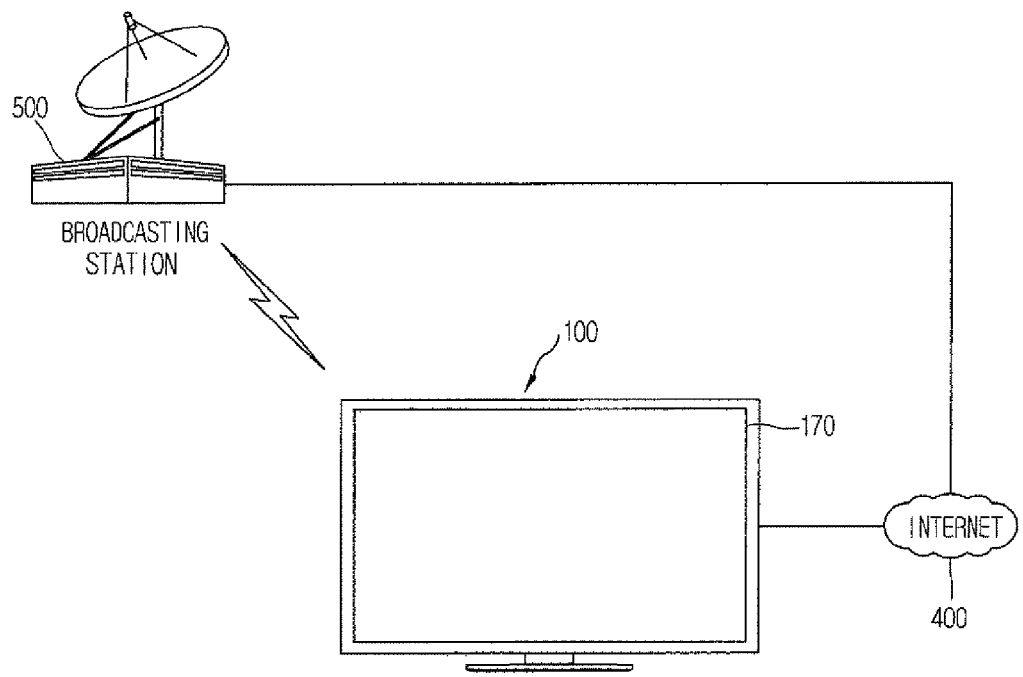
FIG. 1 is a conceptual view of an image display apparatus in accordance with one exemplary embodiment.

FIG. 1 is a schematic view of a system including a display apparatus according to the present disclosure, which may be implemented as a digital broadcast receiver. A display apparatus 100 may also be implemented as a cable broadcasting receiver, a satellite broadcasting receiver or an IPTV digital broadcasting receiver.

Hereinafter, a digital television (DTV) will be described as an example of the display apparatus. However, the display apparatus disclosed herebelow may not be limited to the DTV. For example, the display apparatus may include a set-top box (STB), an Internet protocol TV (IPTV), a personal computer or the like. FIG. 1 schematically illustrates a system to which the present disclosure is applied. The system, as illustrated in FIG. 1, may include a DTV, a broadcasting station 500 and an Internet 400. The DTV may receive a broadcast signal from the broadcasting station 500 and output the received broadcast signal. Also, the DTV may include a device for accessing the Internet 400 by a transmission control protocol/Internet protocol (TCP/IP).

Figure 2:
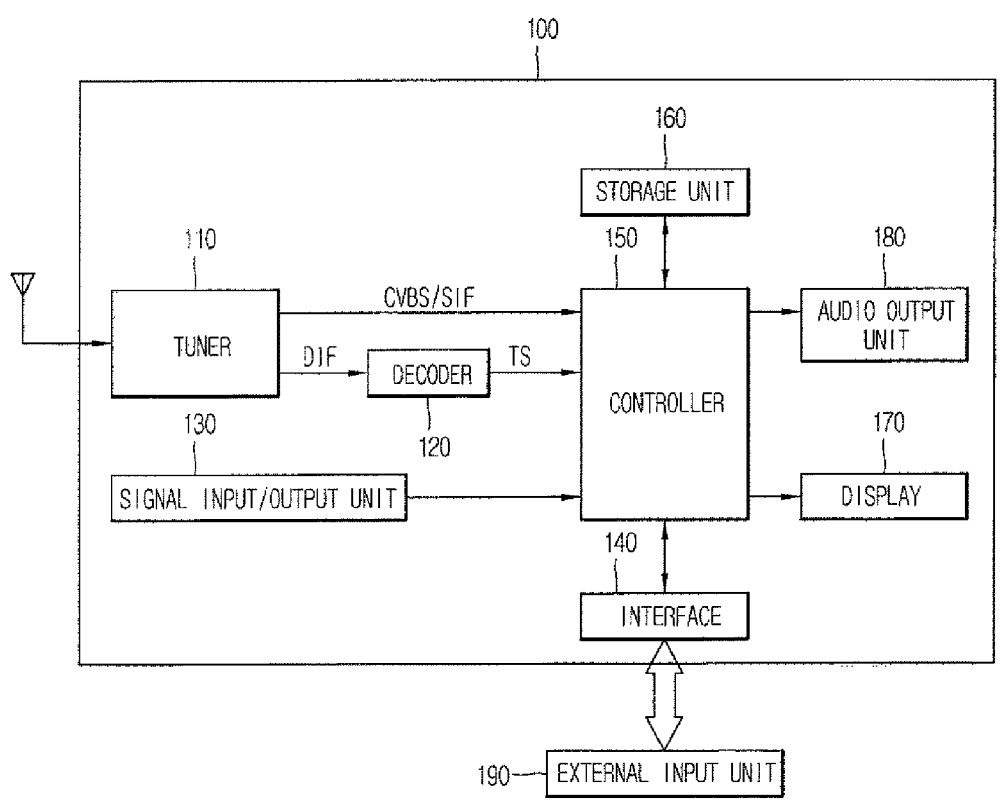
FIG. 2 is a configuration view of an image display apparatus in accordance with one exemplary embodiment.

FIG. 2 is a block diagram illustrating a display apparatus 100 and an external input device 190 associated with the present disclosure.

As illustrated in FIG. 2, the display apparatus 100 may include a tuner 110, a decoder 120, a signal input/output unit 130, an interface 140, a controller 150, a storage unit 160, a display 170 and an audio output module 180.

The tuner 110 may select a radio frequency (RF) broadcast signal, which corresponds to a channel selected by a user, among RF broadcast signals received through an antenna, and convert the selected RF broadcast signal into a medium frequency signal or a baseband image (video)/audio signal. For example, when the RF broadcast signal is a digital broadcast signal, the tuner 110 may convert the RF broadcast signal into a digital IF signal (DIF). On the other hand, when the RF broadcast signal is an analog broadcast signal, the tuner 110 may convert the RF broadcast signal into an analog baseband video/audio signal (CVBS/SIF). The tuner 110 may thus be a hybrid tuner which is capable of processing the digital broadcast signal and the analog broadcast signal.

The digital IF signal (DIF) output from the tuner 110 may be input into the decoder 120, while the analog baseband video/audio signal (CVBS/SIF) output from the tuner 110 may be input into the controller 150. The tuner 110 may receive a signal carrier RF broadcast signal according to an advanced television systems committee (ATSC) standard or a multi-carrier RF broadcast signal according to a digital video broadcasting (DVB) standard.

Although the drawing illustrates one tuner 110, the present disclosure may not be limited to this. The display apparatus 100 may include a plurality of tuners, for example, first and second tuners. In this case, the first tuner may receive a first RF broadcast signal corresponding to a broadcasting channel selected by a user, and the second tuner may receive a second RF broadcast signal corresponding to a pre-stored broadcasting channel in a sequential or periodical manner. Similar to the first tuner, the second tuber may convert an RF broadcast signal into a digital IF signal (DIF) or an analog baseband video or audio signal (CVBS/SIF).

The decoder 120 may receive the digital IF signal (DIF) converted by the tuner 110 and demodulate the received signal. For example, when the DIF output from the tuner 110 is a signal according to the STSC standard, the decoder 120 may perform 8-vestigal side band (8-VBS) demodulation. Here, the decoder 120 may also perform channel decoding, such as trellis decoding, de-interleaving, reed Solomon decoding and the like. To this end, the decoder 120 may include a trellis decoder, de-interleaver, a reed Solomon decoder and the like.

As another example, when the digital IF signal (DIF) output from the tuner 110 is a signal according to the DVB standard, the decoder 120 may perform a coded orthogonal frequency division modulation (COFDMA) demodulation. Here, the decoder 120 may also perform convolution decoding, de-interleaving, reed Solomon decoding and the like. To this end, the decoder 120 may include a convolution decoder, a de-interleaver, a reed Solomon decoder and the like.

The signal input/output unit 130 may perform signal input and output operations by being connected to an external device. To this end, the signal input/output unit 130 may include an A/V input/output unit and a wireless communication unit.

The A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, a liquid HD terminal and the like. Digital signals input through those terminals may be forwarded to the controller 150. Here, analog signals input through the CVBS terminal and the S-video terminal may be forwarded to the controller after being converted into digital signals through an analog-digital converter (not shown).

The wireless communication unit may execute wireless Internet access. For example, the wireless communication unit may execute the wireless Internet access using wireless LAN (WLAN) (Wi-Fi), wireless broadband (Wibro), world interoperability for microwave access (Wimax), high speed downlink packet access (HSDPA) and the like. The wireless communication unit may also perform short-range wireless communication with other electronic devices. For example, the wireless communication unit may perform the short-range wireless communication using Bluetooth, radio frequency identification (RFID), infrared data association (IrDA), ultra wideband (UWB), Zigbee and the like.

The signal input/output unit 130 may transfer to the controller 150 a video signal, an audio signal and a data signal, which are provided from external devices, such as a digital versatile disk (DVD) player, a blu-ray player, a game player, a camcorder, a computer (notebook computer), a portable device, a smart phone and the like. Also, the signal input/output unit 130 may transfer to the controller 150 a video signal, an audio signal and a data signal of various media files, which are stored in an external storage device, such as a memory, a hard disk and the like. In addition, the signal input/output unit 130 may output a video signal, an audio signal and a data signal processed by the controller 150 to other external devices.

The signal input/output unit 130 may perform signal input and output operations by being connected to a set-top box, for example, an Internet protocol TV (IPTV) set-top box via at least one of those various terminals. For instance, the signal input/output unit 130 may transfer to the controller 150 a video signal, an audio signal and a data signal, which has been processed by the IPTV set-top box to enable bidirectional communication, and also transfer signals processed by the controller 150 to the IPTV set-top box. Here, the IPTV may include ADSL-TV, VDSL-TV, FTTH-TV and the like which are divided according to a transmission network.

Digital signals output from the decoder 120 and the signal input/output unit 130 may include a stream signal (TS). The stream signal (TS) may be a signal in which a video signal, an audio signal and a data signal are multiplexed. For example, the stream signal (TS) may be an MPEG-2 transport stream (TS) signal obtained by multiplexing an MPEG-2 video signal and a Dolby AC-3 audio signal. An MPEG-2 TS signal may include a 4-byte header and a 184-byte payload.

The interface 140 may receive an input signal for power control, channel selection, screen setting or the like from an external input device 190 or transmit a signal processed by the controller 150 to the external input device 190. The interface 140 and the external input device 190 may be connected to each other in a wired or wireless manner.

The controller 150 may control an overall operation of the display apparatus 100. For example, the controller 150 may control the tuner 110 to tune an RF broadcast signal corresponding to a user-selected channel or a pre-stored channel. Although not shown, the controller 150 may include a demultiplexer, a video processor, an audio processor, a data processor, an On screen display (OSD) generator and the like.

The controller 150 may demultiplex an MPEG-2 TS signal into a video signal, an audio signal and a data signal.

The controller 150 may perform a video processing, for example, demodulation (decoding) for a demultiplexed video signal. In more detail, the controller 150 may decode an MPEG-2 encoded video signal using an MPEG-2 decoder, and decode an H.264-encoded DMB or DVB-handheld (DVB-H) signal using an H.264 decoder. Also, the controller 150 may adjust brightness, tint or color of the video signal. The video signal processed by the controller 150 may be transferred to the display 170 or an external output device (not shown) via an external output terminal.

The controller 150 may process, for example, decode a demultiplexed audio signal. In more detail, the controller 150 may decode an MPEG-2 encoded audio signal using an MPEG-2 decoder, an MPEG-4 bit sliced arithmetic coding (BSAC)-encoded DMB audio signal using an MPEG-4 decoder, and an MPEG-2 advanced audio codec (AAC)-encoded DMB or DVB-H audio signal using an AAC decoder. Also, the controller may adjust base, treble and sound volume of the audio signal. The audio signal processed by the controller 150 may be transferred to the audio output unit 180, for example, a speaker, or transferred to an external output device.

The controller 150 may process an analog baseband video/audio signal (CVBS/SIF). Here, the analog baseband video/audio signal (CVBS/SIF) input to the controller 150 may be an analog baseband video/audio signal output from the tuner 110 or the signal input/output unit 130. The processed video signal may be displayed on the display 170 and the processed audio signal may be output through the audio output unit 180.

The controller 150 may process, for example, decode a demultiplexed data signal. Here, the data signal may include electronic program guide (EPG) information, which may include broadcast information, such as start time, end time and the like, related to a broadcast program broadcasted on each channel. The EPG information may include ATSC-program and system information protocol (ATSC-PSIP) information and DVB-service information (DVB-SI) information. the ATSC-PSIP information or DVB-SI information may be included in an MPEG-4 TS header (4 bytes).

The controller 150 may perform on-screen display (OSD) processing. In more detail, the controller 150 may generate an OSD signal for displaying various information as graphic or text data based on at least one of a video signal and a data signal or an input signal received from the external input device 190. The OSD signal may include various data such as a user-interface (UI) screen for the image display apparatus 100 and various menu screens, widgets, icons and the like.

The storage unit 160 may store various programs for signal processing and control by the controller 150, and may also store processed video, audio and data signals. The storage unit 160 may include at least one of a flash memory-type storage medium, a hard disc-type storage medium, a multimedia card micro-type storage medium, a card-type memory (for example, SD or XD memory), a random access memory (RAM), a read-only memory (ROM), electrically erasable programmable ROM (EEPROM), a magnetic memory, a magnetic disk and an optical disk.

The display 170 may convert a processed video signal, a processed data signal, and an OSD signal provided by the controller 160 into RGB signals, thereby generating driving signals. The display 170 be implemented into various types of displays such as a plasma display panel, a liquid crystal display (LCD), a thin film transistor-LCD (TFT-LCD), an organic light-emitting diode (OLED), a flexible display, a three-dimensional (3D) display, an e-ink display and the like. The display 170 may also be implemented as a touch screen and may thus be used as an input device.

The audio output unit 180 may receive a processed audio signal (e.g., a stereo signal or a 5.1-channel signal) from the controller 160. The audio output unit 180 may be implemented in various types of speakers.

The external input device 190 may be connected to the interface 140 in a wired or wireless manner so as to transmit an input signal generated in response to a user's input to the interface 140. The external input device 190 may include a remote control device, a mouse, a keyboard and the like. The remote control device may transmit an input signal to the interface using various communication techniques such as Bluetooth, RF, IR, UWB and ZigBee. The remote control device may be a spatial remote control device. The spatial remote control device may generate an input signal by sensing an operation of a main body within a space.

The display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the display apparatus 100 may be a IPTV digital broadcast receiver capable of receiving cable broadcast programs, satellite broadcast programs or IPTV programs.

Figure 3A:
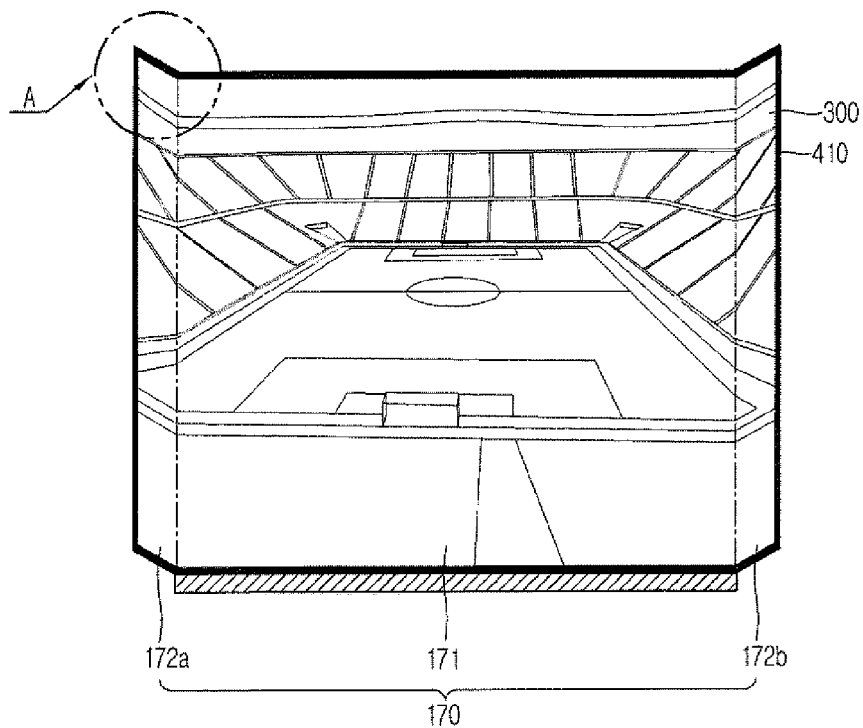
FIG. 3A is a front perspective view of an image display apparatus in accordance with one exemplary embodiment.
Figure 3B:
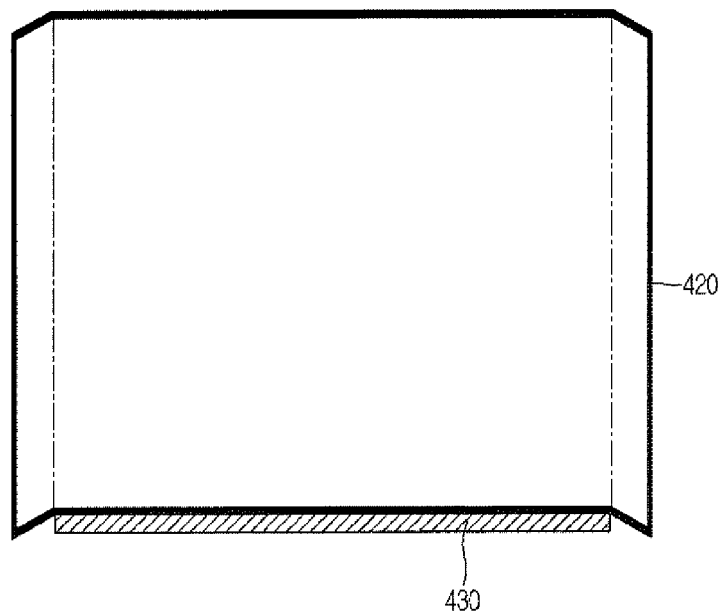
FIG. 3B is a rear perspective view of the image display apparatus shown in FIG. 3A.
Figure 3C:
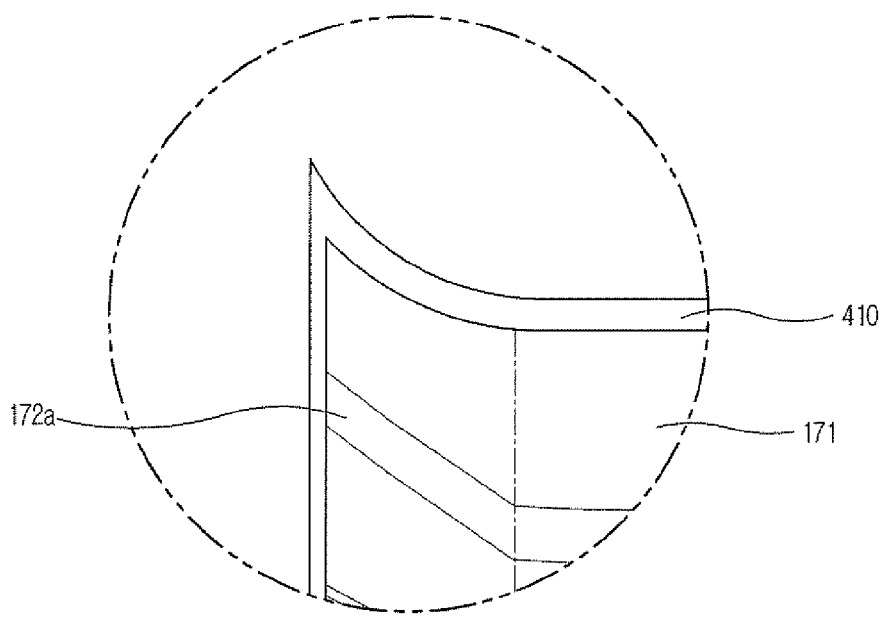
FIGS. 3C and 3D are partially enlarged views of a part A shown in FIG. 3A.
Figure 3D:
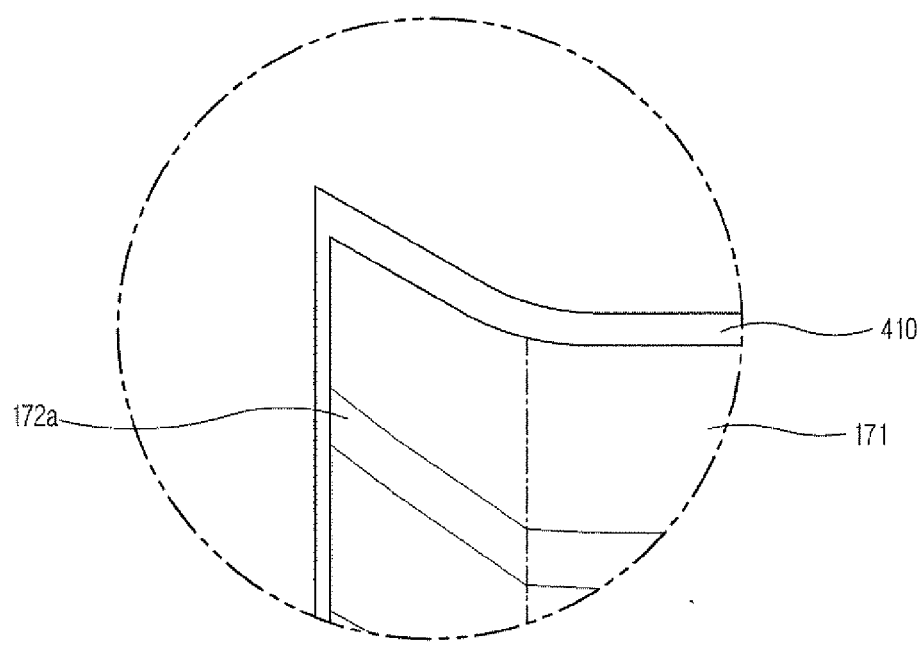

FIG. 3A is a front perspective view of an image display apparatus in accordance with one exemplary embodiment, FIG. 3B is a rear perspective view of the image display apparatus shown in FIG. 3A, and FIGS. 3C and 3D are partially enlarged views of a part A shown in FIG. 3A.

As illustrated in FIGS. 3A and 3B, the display 170 of the image display apparatus 100 may have a bent portion formed on at least one edge thereof. The display 170 may include a plane portion 171 and first and second bent portions 172a and 172b extending from left and right sides of the plane portion 171. The first and second bent portions 172a and 172b may be bent from predetermined edges of the plane portion 171 at a preset angle with a preset width.

For example, a width of each of the first and second bent portions 172a and 172b may be ⅙ of a width of the plane portion 171, but may not be limited to this. The first and second bent portions 172a and 172b may have different widths from each other.

Although not shown, an output area on the bent portion may be limited to have a preset width according to a user's setting.

The display 170 may include a display panel for outputting a video based on a signal. For example, the display panel may include an organic electroluminescent light-emitting device, which is so-called an organic light emitting diode (OLED).

The OLED display panel is a device which is configured such that when electrons and holes are injected into an organic light emitting layer formed between a first electrode (anode) as a hole injecting electrode and a second electrode (cathode) as an electron injecting electrode, the electrons and the holes are combined as a pair to generate excitons, which are extinguished with falling from an excited state to a base state, thereby emitting light.

The OLED display panel may represent three colors, namely, green, blue and red colors, and may not require a backlight. The OLED display panel may also exhibit low power consumption and a relatively thin thickness.

The display panel according to the present disclosure may be implemented by forming the OLED on a base substrate which is made of a flexible transparent material. The base substrate may be a transparent plastic substrate. This may allow the display panel to be bent (or curved) into a desired shape by pressure which is externally applied.

The bent portion may extend from the plane portion 171 to have a curved surface as shown in FIG. 3C, or extend from the plane portion 171 to have a flat surface as shown in FIG. 3D.

The display 170 may output screen information on at least one of the plane portion 171 and the first and second bent portions 172a and 172b. The controller 150 may decide an area for outputting the screen information based on a user's control command or a user's setting, and recalculate a size of the screen information to correspond to the decided area. Also, the controller 150 may control the display 170 to output the screen information with the recalculated size.

The image display apparatus 100 may include a bezel part 410 which supports edges of the display 170. The bezel part 410 may also be bent to correspond to the bent portions. The bezel part 410 may be formed along edges of the display 170, and the bent portions may be formed such that the bezel part 410 cannot be viewed from a front surface of the display 170. The bezel part 410 may be more than about 2.5 mm wide.

The image display apparatus 100 may further include a rear case 400 for covering a rear surface of the display 170, and a fixing unit 430 fixed to the rear case 400 so as for the image display apparatus 100 to be set up or installed on a predetermined object.

Referring to FIG. 3A, the controller 150 may control screen information 300 to be output on the plane portion 171 and the first and second bent portions 172a and 172b. That is, the controller 150 may divide the screen information 300 to correspond to the plane portion 171 and the first and second bent portions 172a and 172b and control the display 170 to output the divided screen information 300 continuously on each area (portion).

FIGS. 3A and 3B illustrate that the first and second bent portions 172a and 172b are bent from front to rear sides. However, the first and second bent portions 172a and 172b may protrude toward the front surface based on the plane portion 171. The display 170 may also include only one of the first and second bent portions 172a and 172b. The first and second bent portions 172a and 172b may have different widths and bent angles from each other.

Figure 4A:
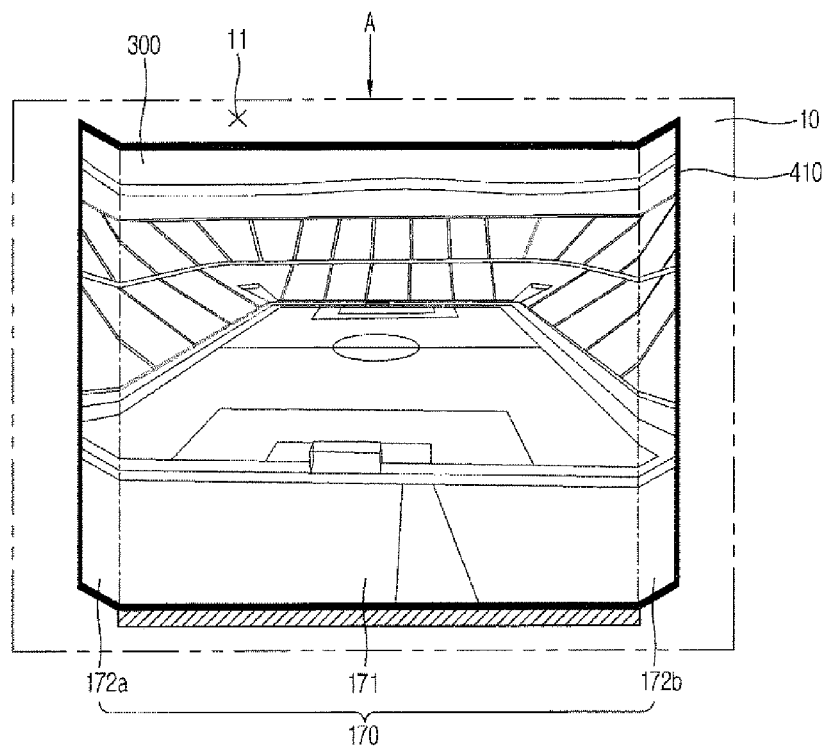
FIGS. 4A and 4B are conceptual views illustrating an example of installation of the image display apparatus.
Figure 4B:
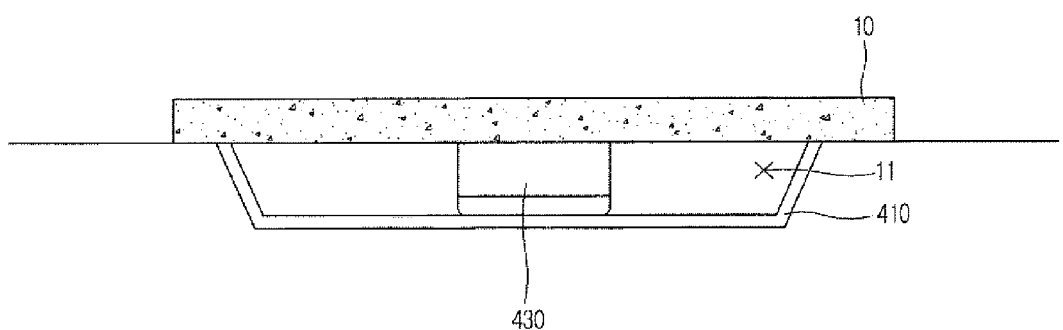

FIG. 4A is a conceptual view illustrating an example of installing the image display apparatus, and FIG. 4B is a conceptual view of the image display apparatus mounted on a wall surface, viewed in a direction A. The image display apparatus including the first and second bent portions 172a and 172b may be installed on a wall surface 10. To install the image display apparatus 100 on the wall surface 10, the fixing unit 430 may be formed on a rear surface of the image display apparatus.

The image display apparatus 100 may be installed such that one area of the bezel part 410 comes in contact with the wall surface 10. In detail, the part of the bezel part 410 which is formed on the edges of the first and second bent portions 172a and 172b may come in contact with the wall surface 10.

A thickness of the fixing unit 430 may be smaller than or substantially the same as a width from the plane portion 171 to the bent portion. The fixing unit 430 may thusly be obscured by the display 170 when the image display apparatus is installed on the wall surface 10. Accordingly, with the fixing unit 430 being obscured when the image display apparatus (e.g., a wall-mountable TV) is installed on the wall surface 10, a simple appearance of the image display apparatus may be formed, and integration between the display 170 and the wall surface may be realized.

FIG. 5 is a conceptual view illustrating a control method of outputting a video in accordance with one exemplary embodiment. The controller 150 may selectively output a video on the first and second bent portions 172a and 172b.

As illustrated in FIG. 5A, the controller 150 may control the display 170 to output the screen information 300 only on the plane portion 171 based on a user's control command. Accordingly, the display 170 may control the display 170 to deactivate (see 301') the first and second bent portions 172a and 172b, or output a preset video on the first and second bent portions 172a and 172b.

On the other hand, the controller 150 may recalculate a size of the screen information from the state shown in FIG. 5A such that a part of the screen information 300 can be output on the first and second bent portions 172a and 172b, and control the display 170 to output the screen information 300 with the recalculated size, based on a user's control command as shown in FIG. 5B.

That is, the user may adjust an area of the display 170, on which the screen information is output, while the screen information is output on the display 170.

Figure 6A:
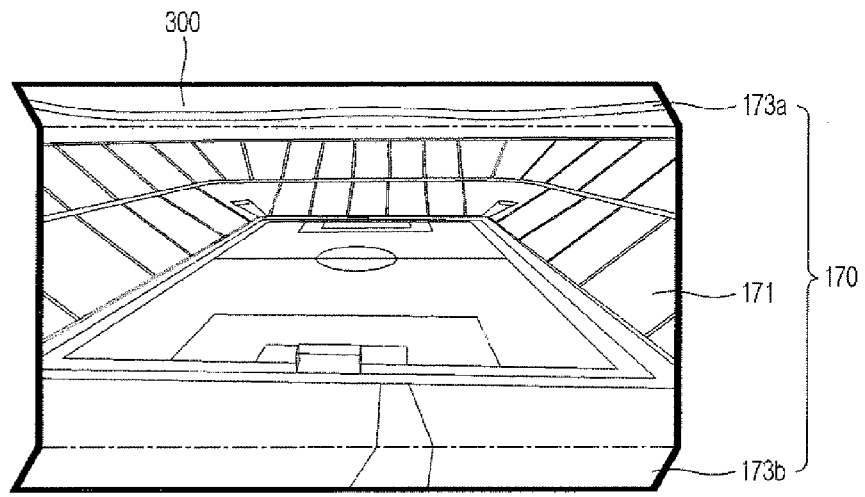
FIGS. 6A and 6B are front perspective views of an image display apparatus in accordance with another exemplary embodiments.
Figure 6B:
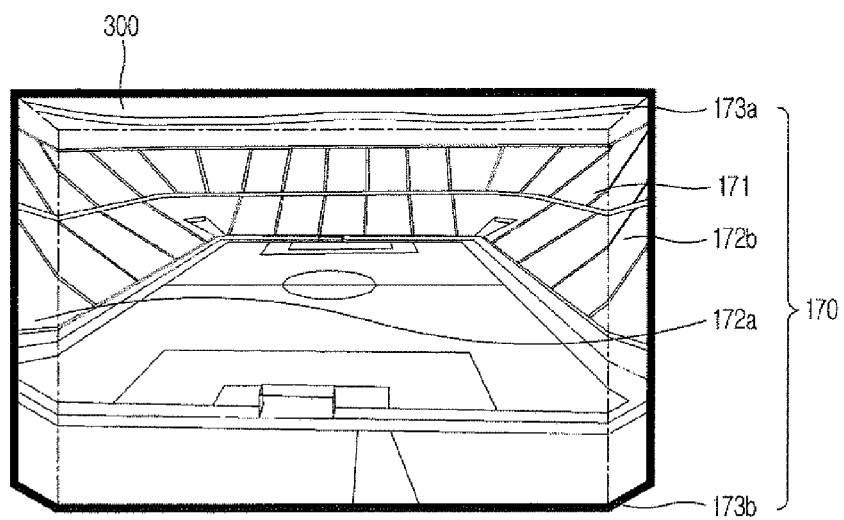

The display 170 having the plane portion and the bent portion may be implemented into various forms. FIGS. 6A and 6B are front perspective views of an image display apparatus in accordance with another exemplary embodiments.

As illustrated in FIG. 6A, the display 170 may include third and fourth bent portions 173a and 173b extending from upper to lower edges of the plane portion 171, respectively. The third and fourth bent portions 173a and 173b may have preset widths, and be bent from the edges of the plane portions 171 by a preset angle. Also, the third and fourth bent portions 173a and 173b may have a flat surface or a curved surface.

The controller 150 may output the screen information 300 on at least one of the third and fourth bent portions 173a and 173b.

As illustrated in FIG. 6B, the display 170 may include first to fourth bent portions 172a, 172b, 173a and 173b extending from left, right, upper and lower edges of the plane portion 171.

As such, an image display apparatus according to the present invention may include bent portions extending from a plane portion for providing an aesthetic effect in the aspect of appearance design and user's convenience, and may have no limit on a shape of the bent portion. Therefore, the display 170 may be implemented into various shapes.

Figure 7A:
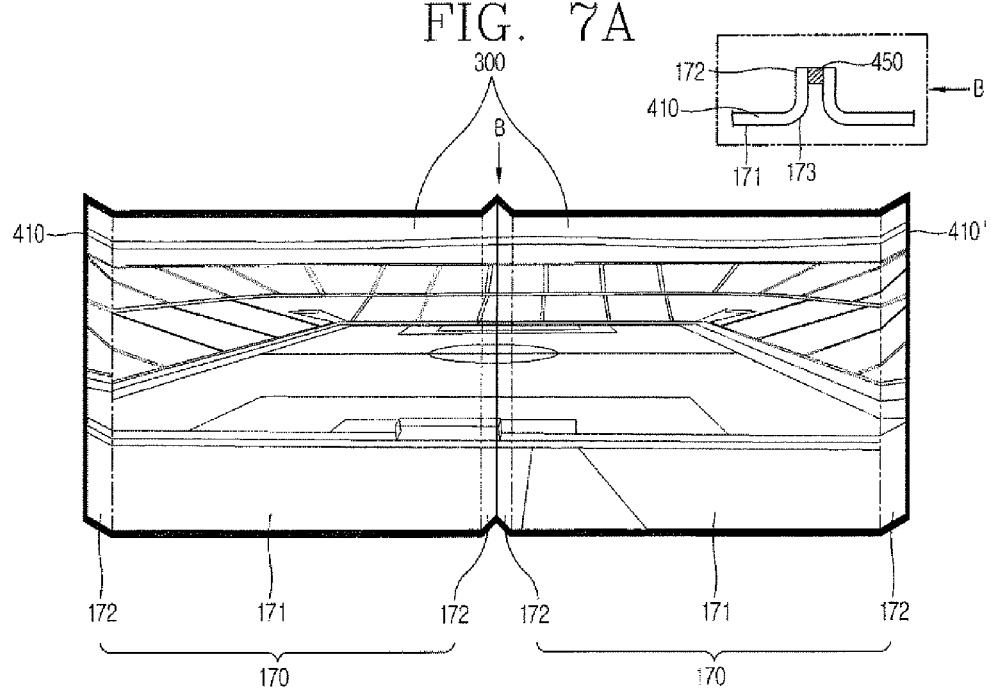
FIGS. 7A to 7C are conceptual views illustrating an image display apparatus having a plurality of displays.
Figure 7B:
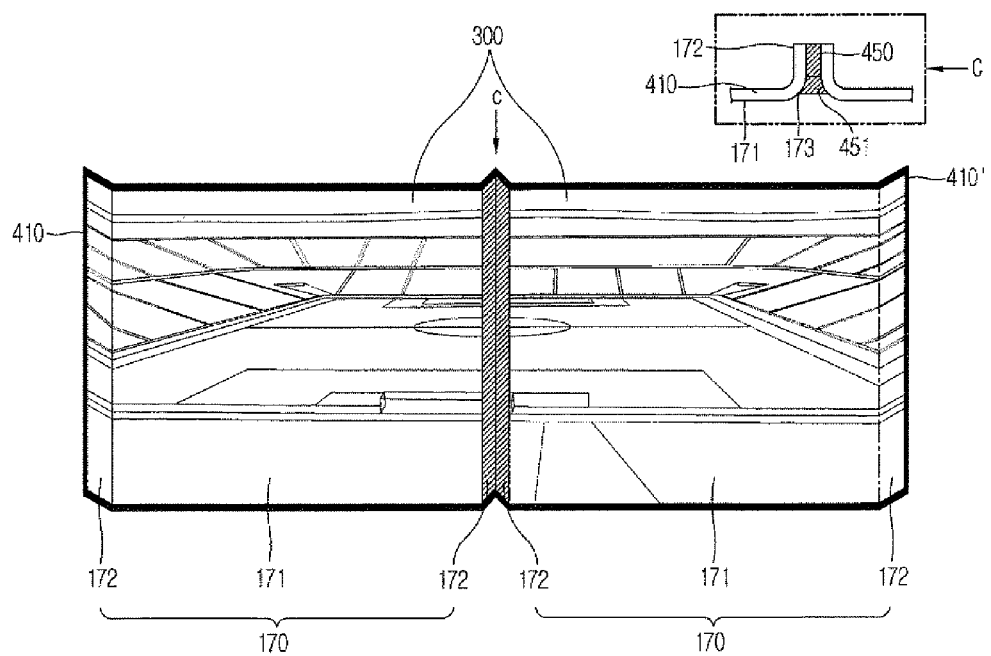
Figure 7C:
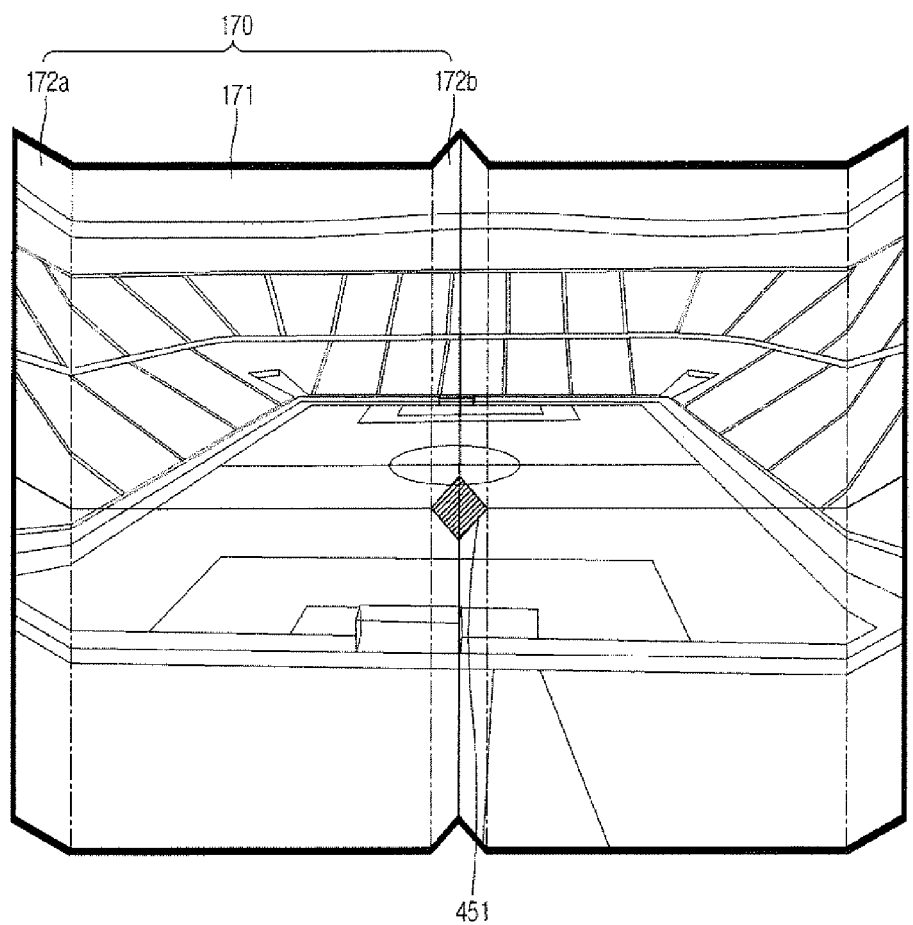

FIGS. 7A to 7C are conceptual views illustrating an image display apparatus having a plurality of displays 170.

As illustrated in FIG. 7A, a screen-division image display apparatus may be implemented by attaching a plurality of displays 170. That is, the screen information 300 may be output, in a dividing manner, on the displays 170 of two image display apparatuses having edges attached onto each other.

Referring to an enlarged view viewed from a direction B, illustrated in FIG. 7A, two bent portions 172 may be attached onto each other to couple two image display apparatuses to each other. In accordance with this exemplary embodiment, to attach the two bent portions 172 onto each other, each bent portion 172 may have a flat surface, and be preferably bent to be perpendicular to the plane portion 171. Here, taking into account a fabricating process of the display panel, a connection portion 173 where the plane portion 171 and the bent portion 172 are connected to each other may be formed to be curved.

An adhesive member 450 may be disposed between the two bent portions 172 to couple the displays 170 to each other. The method of attaching the two bent portions 172 may not be limited to this. An additional coupling member mounted onto the bezel part 410 may be used to couple the two bent portions 172.

In the meantime, the controller 150 may control the display 170 to output a part of the screen information 300 on the connection portion 173. That is, the screen information may be output on the plane portion 171, the bent portions 172 which are not attached, and the connection portion 173.

Here, in order to provide the user with the screen information, which is output on the curved connection portion 173, as a flat image, the controller 150 may compensate for a part of the screen information 300 output on the connection portion 173. That is, the controller 150 may recalculate a shape of the screen information by enlarging a scaling value of the screen information according to curvature of the connection portion 173. This may allow the user to be provided with the screen information which is continuously output even on an area where the two displays 170 are attached onto each other.

That is, a structure for connecting a plurality of displays may not be externally exposed and a user can be provided with continuous screen information, which may result in improvement of integration of the plurality of displays 170 attached onto each other.

Meanwhile, the rest of bent portions except for the bent portion where the plurality of displays 170 are attached to each other may be omitted.

Referring to FIG. 7B, the bent portions 172 of the two displays 170 may be formed to come in contact with each other, and an adhesive member 450 may be disposed between the two bent portions 172.

In accordance with this exemplary embodiment, the controller 150 may control the display 170 to restrict the output of the screen information 300 on the connection portion 173. The image display apparatus may further include an interposed portion 451 interposed between the two curved connection portions 173 so as to obscure the connection portions 173.

That is, the controller 150 may control the display 170 to output the screen information 300 in a dividing manner without a process of compensating for a part of the screen information 300. The interposed portion 451 may be less than 0.5 mm wide.

Referring to FIG. 7C, four displays 170 may be attached to output one screen information 300. A structure of attaching the bent portions 173 of the respective displays 170 is substantially the same as described in FIG. 7A. Therefore, repetitive description thereof will be omitted.

Each display 170 configuring the image display apparatus of FIG. 7C may include bent portions formed on four edges thereof. And, the interposed portion 451 may be disposed in an area where the edges of the four displays 170 meet together.

That is, upon implementing a screen-division display device having the image display apparatus according to the present disclosure, an area where each image display apparatus is attached may not be exposed through the display 170, thereby providing a user with screen information having higher quality.

Also, an externally exposed attached area between the image display apparatuses may be minimized, thereby providing a screen-division display device whose appearance looks more aesthetic.

Various images may be output on the bent portions of the image display apparatus. Hereinafter, description will be given of a control method for an image output on the bent portion.

Figure 8:
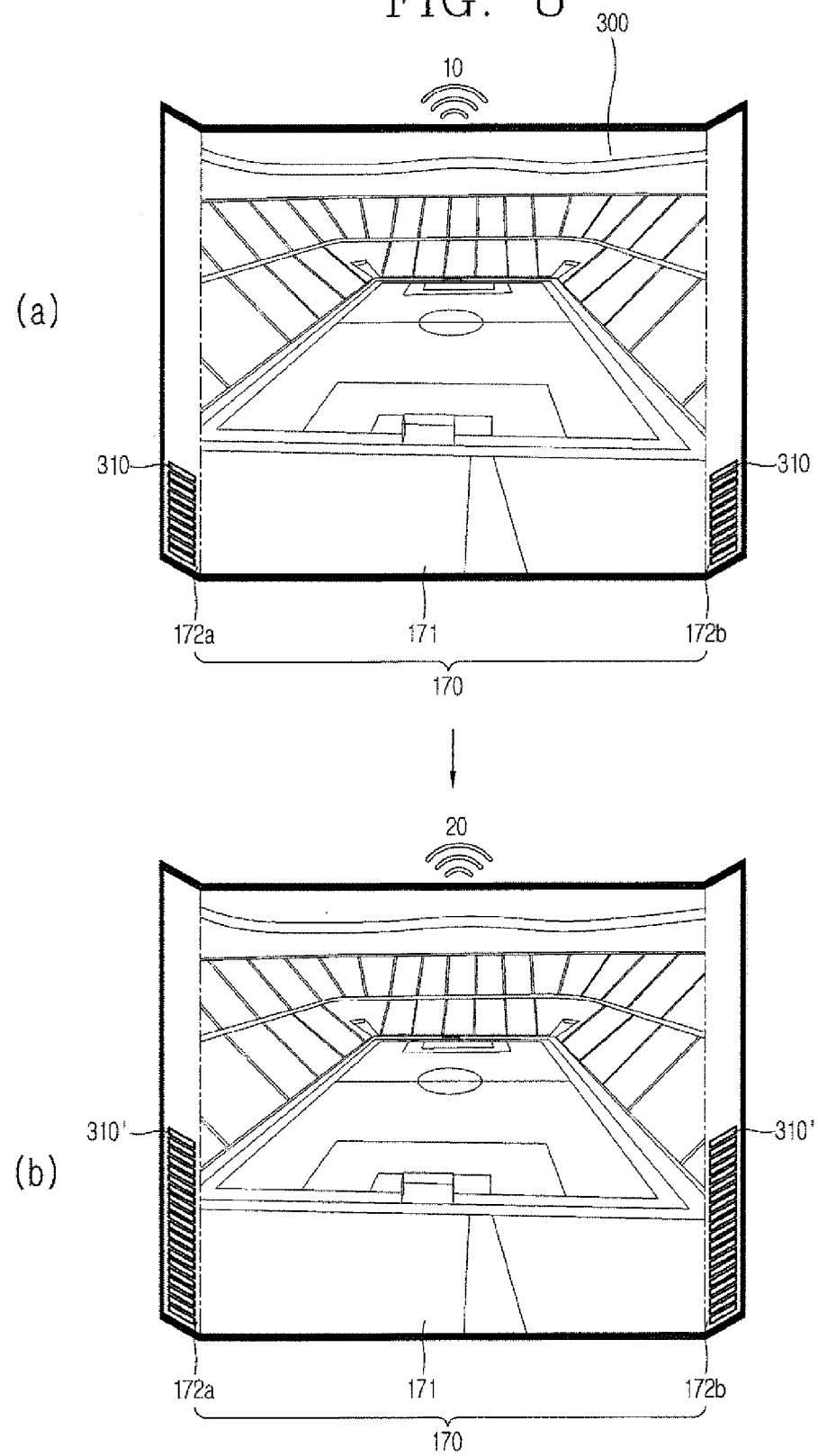
FIG. 8 is a conceptual view illustrating a control method for an image display apparatus in association with a change in volume in accordance with one exemplary embodiment.

FIG. 8 is a conceptual view illustrating a control method for an image display apparatus in association with a change in sound volume in accordance with one exemplary embodiment.

As illustrated in FIG. 8, the display 170 may output the screen information 300 on the plane portion 171. The controller 150 may control the display 170 to output a volume image corresponding to a change in sound volume on the first and second bent portions 172a and 172b.

Referring to FIG. 8A, when sound is output with a volume level of about 10 on the image display apparatus, the controller 150 may output a first image 310 corresponding to the sound volume on the first and second bent portions 172a and 172b.

Referring to FIG. 8B, when sound is output with a volume level of about 20 in the image display apparatus, the controller 150 may control the display 170 to convert the first image 310, which have been output on the first and second bent portions 172a and 172b, into first converted image 310'.

As illustrated in FIG. 8, the first image 310 and the first converted image 310' may have a shape with plural bars which are arranged in one direction. With outputting a different number of bars included in the first image 310 and the first converted image 310', the volume of the sound output from the audio output unit 180 can be indicated. That is, the first image 310 and the first converted image 310', which are configured with the bars to provide a user with information related to a volume difference, may have different lengths from each other.

Here, the shapes of the first image 310 and the first converted image 310' may not be limited to those, but be implemented as different images which allow the change in sound volume to be distinguished.

The controller 150 may control the display 170 to output the volume image on the first and second bent portions 172a and 172b while the screen information 300 is output on the plane portion 171. Unlike to this, the controller 150 may control the display 170 to output the volume image on the first and second bent portions 172a and 172b when a control command for adjusting the volume is applied onto the image display apparatus.

The volume image may be output on one of the first and second bent portions 172a and 172b. The first image 310 and the first converted image 310' may be output as images which change as a time elapses.

Accordingly, the user can visually recognize information relating to the volume which is changing. Also, the volume image may be displayed on an area which is partitioned from an area where the screen information is output. This may allow volume information to be provided without obscuring screen information.

Figure 9:
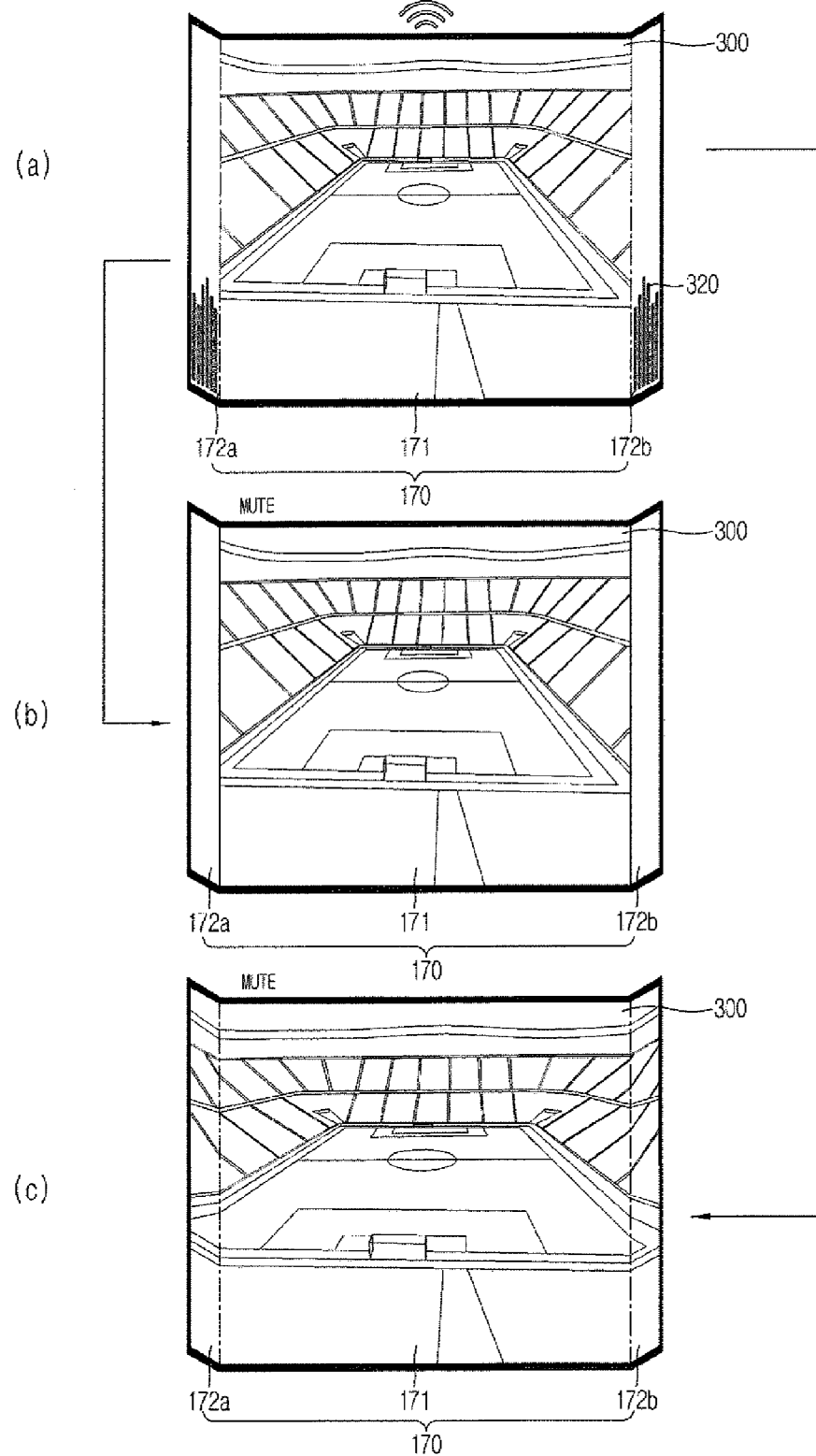
FIG. 9 is a conceptual view illustrating a control method for an image display apparatus in association with a change in volume in accordance with another exemplary embodiment.

FIG. 9 is a conceptual view illustrating a control method for an image display apparatus in association with a change in volume in accordance with another exemplary embodiment.

As illustrated in FIG. 9A, the screen information 300 may be output on the plane portion 171 of the display 170 and sound may be output from the audio output unit 180 of the image display apparatus. The controller 150 may control the display 170 to output a second image 320 corresponding to sound effects on the first and second bent portions 172*a* and 172*b*. Here, the second image 320 may be implemented as a move clip indicating a sound equalizer.

Referring to FIGS. 9A and 9B, the controller 150 may control the audio output unit 180 to restrict the output of the sound on the image display apparatus based on a control command for restricting the output of the sound.

Also, the controller 150 may restrict an output of the second image 320, which are output on the first and second bent portions 172*a* and 172*b*, based on the control command. Accordingly, in accordance with this exemplary embodiment, when the image display apparatus is in a mute state based on the control command, the controller 150 may control the display 170 to restrict an image output on the first and second bent portions 172*a* and 172*b* such that any image is not output thereon. Here, the controller 150 may control the display 170 to deactivate the first and second bent portions 172*a* and 172*b*.

This may provide the user with sound effects using visual information and allow the user to visually recognize even the mute state.

In the meantime, referring to FIGS. 9A and 9C, based on a mute control command applied to the image display apparatus, the controller 150 may restrict the output of the second image 320 which have been output on the first and second bent portions 172*a* and 172*b*. Also, the controller 150 may control the display 170 to output the screen information on the first and second bent portions 172*a* and 172*b* and the plane portion 171. That is, the screen information 300 may be output on the entire display 170 in the mute state.

The controller 150 may recalculate the size of the screen information based on the control command, restrict the output of the second image 320, and control the display 170 to fully output the screen information 300.

In accordance with this exemplary embodiment, the user can restrict the output of sound, and also output a video by extending a screen up to the bent portions when desiring to receive only the video.

The user may set an area for outputting the screen information in the mute state. The second image 320 may be output on one of the first bent portion 172*a* and the second bent portion 172*b*.

Figure 10:
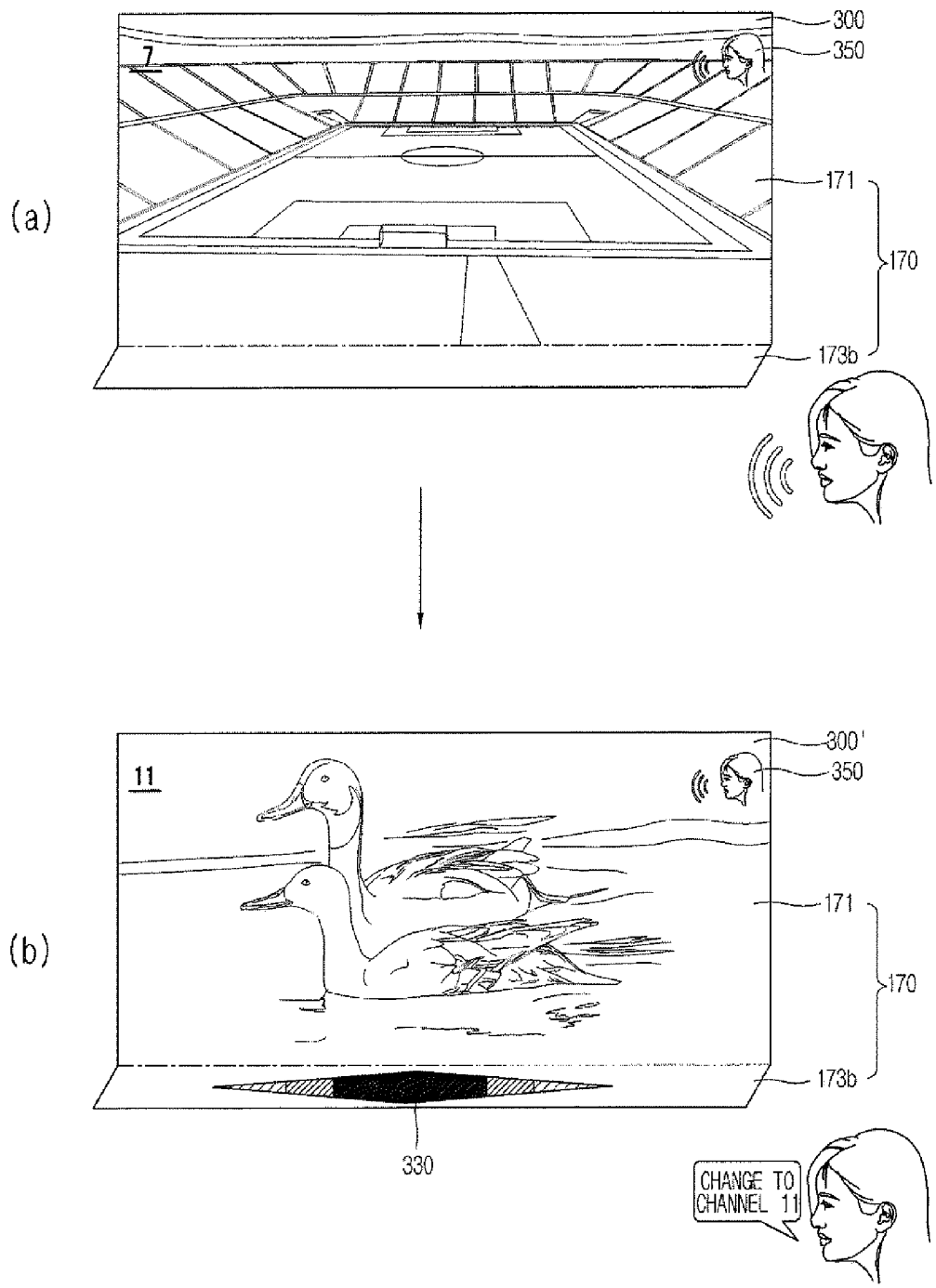
FIG. 10 is a conceptual view illustrating a control method for an image display apparatus according to a voice recognition function.

FIG. 10 is a conceptual view illustrating a control method for an image display apparatus according to a voice recognition function. The image display apparatus illustrated in FIG. 10 may further include a microphone for allowing a user to input a voice. The controller 150 of the image display apparatus may generate a control signal in response to a user's voice, and control the image display apparatus based on the control signal.

For example, the controller 150 may change screen information output on the display 170 or execute the change in an output state of the screen information and sound adjustment based on a user's voice.

Referring to FIG. 10A, the display 170 of the image display apparatus may include the plane portion 171 and a fourth bent portion 173*b* which extends from a lower edge of the plane portion 171. The screen information 300 may be output on the plane portion 171.

The controller 150 may control the display 170 to output a voice recognition indicator 350 when the image display apparatus is converted into a voice recognition mode for controlling the image display apparatus based on a user's voice.

Referring to FIG. 10B, based on a user's voice applied to the image display apparatus, the controller 150 may control the display 170 to output a third image 330 which indicates that the user's voice has been applied.

The third image 330 may be output as an image which is changing in response to the change in the voice. The controller 150 may control the display 170 to output the third image 330 in correspondence with sound effects and volume of the voice.

For example, the controller 150 may recognize a voice "Change to Channel 11" applied by the user, and convert the screen information 300 into another screen information 300' corresponding to "Channel 11." With the voice being recognized, the controller 150 may control the display 170 to output the third image 330 on the fourth bent portion 173*b*' and change the third image 330 in correspondence with the voice.

Accordingly, the user can recognize the state that his or her voice is being input to the image display apparatus in the voice recognition mode.

FIGS. 11A and 11B are conceptual views illustrating a control method for an image display apparatus according to a touch sensing function. The image display apparatus according to this exemplary embodiment may include a touch sensing unit formed on at least one of the first and second bent portions 172*a* and 172*b*. This may allow the user to manipulate an external input device for controlling the image display apparatus and to apply a touch input onto the bent portion of the image display apparatus.

In accordance with this exemplary embodiment, the touch sensing unit may also be formed both on the first and second bent portions 172*a* and 172*b* and on the plane portion 171.

Referring to FIG. 11A-A, the screen information 300 may be output on the plane portion 171. The touch sensing portion may be formed on the second bent portion 172*b*. The controller 150 may control the display to output at least one graphic image 340, to which a touch input is applied for generating a control signal, on the second bent portion 172*b*. When the touch input is not applied, the controller 150 may control the display 170 to restrict an output of an image on the first bent portion 172*a* or output the screen information 300 on the first bent portion 172*a* and the plane portion 171.

Referring to FIG. 11A-A and FIG. 11A-B, when a touch input is applied onto the second bent portion 172*b*, the controller 150 may control the image display apparatus to perform a function in response to the control signal. For example, the controller 150 may control the display 170 to change the volume of sound output from the audio output unit 180.

In the meantime, the controller 150 may output a fourth image 340' on the first bent portion 172*a* based on a control signal generated in response to the touch input applied onto the second bent portion 172*b*. The fourth image 340' may be formed in a different shape according to each graphic image included in the second bent portion 172*b*.

Referring to FIG. 11A-A and FIG. 11A-C, when the screen information 300 is output only on the plane portion 171, the controller 150 may control the display 170 to output the screen information 300 on the first bent portion 172*a* and the plane portion 171 based on a touch input applied onto the second bent portion 172*b*. That is, the display 170 may be controlled based on the touch input applied onto the second bent portion 172*b*.

The graphic image 340 may be output on the second bent portion 172*b* to overlap the screen information 300.

The image display apparatus according to FIG. 11B-A and FIG. 11B-B may further include a distance sensing unit (not shown). The distance sensing unit may be implemented as a sensor for sensing an object which approaches the display 170 within a preset distance. The distance sensing unit may be a proximity sensor and the like.

The distance sensing unit may sense a user's hand (or a touch tool) which approaches the display 170. The distance sensing unit may preferably be located adjacent to a location where a touch sensing unit for sensing a touch input is formed. For example, the touch sensing unit and the distance sensing unit may all be formed on the second bent portion 172b.

When the user's hand approaching the second bent portion 172b is sensed by the distance sensing unit (not shown), the controller 150 may control the display 170 to output a graphic image 340, to which a touch input is applied, on the second bent portion 172b. The controller 150 may control the display 170 to output the screen information 300 on the first bent portion 172a and the plane portion 171 and restrict the output of the screen information 300 on the second bent portion 172b.

Accordingly, the user may apply the touch input onto the graphic image so as to control the image display apparatus.

In the meantime, when the user's hand is not sensed by the distance sensing unit, the controller 150 may control the display 170 to restrict the output of the graphic image 340 displayed on the second bent portion 172b and output the screen information 300 back on the second bent portion 172b.

Referring to FIG. 11B-A and FIG. 11B-C, when the user's hand is sensed by the distance sensing unit, the controller 150 may control the display 170 to output the graphic image 340 on the screen information 300 on the second bent portion 172b. That is, when the user's hand is located adjacent to the display 170, the graphic image 340 may be displayed while the screen information 300 is continuously output.

Accordingly, the user may continuously be provided with the entire screen information and simultaneously control the image display apparatus by applying a touch input.

Figure 12:
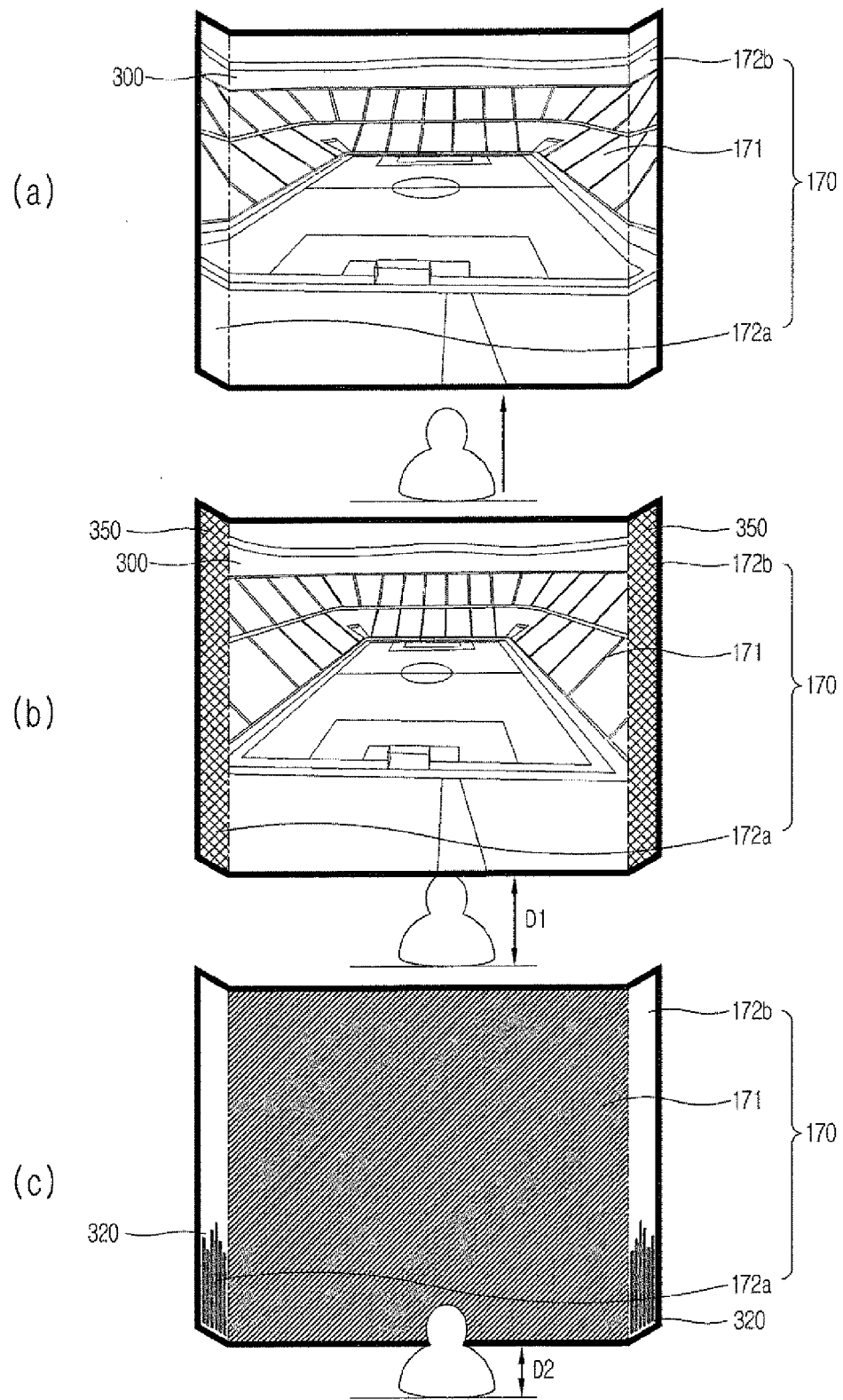
FIG. 12 is a conceptual view illustrating a control method for an image display apparatus according to a user location recognition function.

FIG. 12 is a conceptual view illustrating a control method for an image display apparatus according to a user location recognition function. The image display apparatus according to this exemplary embodiment may further include a distance sensing unit (not shown) for sensing a distance with a user who is located at the front of the display 170 to receive (view) screen information. To sense a distance with the user who is viewing the screen information 300, the distance sensing unit may preferably be formed adjacent to the plane portion 171.

Referring to FIG. 12A, the screen information 300 may be output on the first and second bent portions 172a and 172b and the plane portion 171.

Referring to FIG. 12B, the distance sensing unit may sense the user who is viewing the screen information 300. When a distance from the display 170 to the user sensed by the distance sensing unit is closer than a preset first reference distance D1, the controller 150 may control the display 170 to restrict the output of the screen information 300 and output a fifth image 350 on the first and second bent portions 172a and 172b.

The controller 150 may control the display 170 to output the screen information 300 on the plane portion 171. The fifth image 350 may be a warning image which informs the user of a too short viewing distance. Accordingly, the fifth image 350 may be implemented in a manner of emitting light with a preset color, moving, flickering or the like.

Although not shown, based on a viewing distance sensed by the distance sensing unit, the controller 150 may control the display 170 to change an image, which is output on the first and second bent portions 172a and 172b while the screen information 300 is output on the plane portion 171. For example, a color of the image output on the first and second bent portions 172a and 172b may change or numerical information relating to the viewing distance may be output.

When the user is sensed by the distance sensing unit to be located closer than a second reference distance D2, which is shorter than the first reference distance D1, the controller 150 may restrict the output of the screen information 300 on the plane portion 171. That is, when the user's viewing distance is more shortened, the controller 150 may control the display 170 to deactivate the plane portion 171 for protecting the user.

Here, with the output of the screen information 300 being restricted, sound corresponding to the screen information 300 may be output. Accordingly, the controller 150 may control the display 170 to output the second image 320 corresponding to the sound on the first and second bent portions 172a and 172b.

Since the user is able to recognize the second image 320 corresponding to the output of the sound, the user may recognize the deactivation of the plane portion 171 as a warning for the viewing distance other than an error of the display 170.

Instead of the deactivation of the plane portion 171, the controller 150 may control the display 170 to output another image for warning the too short viewing distance on the plane portion 171 or adjust brightness of the screen information 300, based on a user setting.

Also, the controller 150 may control the display 170 to output the screen information 300 on at least one area of the display 170 again when the user's viewing distance changes.

In accordance with this exemplary embodiment, information based on the user's location may be provided while the screen information is continuously provided.

FIGS. 13A and 13B are conceptual views illustrating a control method for an image display apparatus according to a notification function.

Hereinafter, description will be given of a control method of displaying information according to a viewing time on the bent portion, with reference to FIG. 13A. According to this exemplary embodiment, the controller 150 may record a time for which the display 170 is activated.

The screen information 300 may be output on the plane portion 171. When the recorded time is more than a first reference time set by the user, the controller 150 may control the display 170 to output a sixth image 361 on the first and second bent portions 172a and 172b.

The sixth image 361 may be implemented to output light with a preset color or implemented as at least one of a preset image, a current time and an activation time of the display 170.

In the meantime, when the recorded time is more than a second reference time set by the user, the controller 150 may control the display 170 to output a sixth converted image 362 on the first and second bent portions 172a and 172b.

The sixth converted image 362 may be implemented to output light with a color different from the color of the sixth image 361, or may include a current time and an activation time of the display 170. That is, the controller 150 may notify information related to the activated time of the display 170 to the user such that the user can recognize a time for which he or she has viewed the screen information on the display 170. Also, since a different type of image may be output according to the lapse of time, the user can recognize the lapse of time while viewing the screen information, thereby preventing excessive viewing.

Hereinafter, description will be given of a control method for informing an operation of an image display apparatus while screen information is output, with reference to FIG. 13B. Here, the operation of the image display apparatus may correspond to an operation activated without a user's control command. Referring to FIG. 13B-A, the screen information 300 may be output on the plane portion 171. A part of the screen information 300 or another image may be output on the first and second bent portions 172a and 172b.

Referring to FIG. 13B-A and FIG. 13B-B, the image display apparatus may further include a wireless communication unit (not shown) for receiving a wireless signal. When a message is received in the image display apparatus through the wireless communication unit, the controller 150 may notify information relating to the message reception to the user using the second bent portion 172b. That is, the controller 150 may control the display 170 to output a seventh image 371 on the second bent portion 172b.

That is, the screen information 300 may be output on the plane portion 171 and another information may be provided on the bent portion, thereby notifying the message reception and the like without interfering with the output of the screen information 300.

Although not shown, the controller 150 may control the display 170 to output the screen information 300 on the first and second bent portions 172a and 172b and the plane portion 171 and convert the second bent portion 172b into another image when a message is received.

Referring to FIG. 13B-A and FIG. 13B-C, when a recording function of the screen information is executed at a user-preset time while the screen information is output, the controller 150 may inform the user of information that the recording function has been executed. The controller 150 may execute the recording function at the preset time and control the display 170 to output an eighth image 372 on the first bent portion 172a.

That is, the controller 150 may control the display 170 to output a specific image on at least one of the first and second bent portions 172a and 172b according to each function.

Accordingly, the user may recognize a function executed in the image display apparatus while receiving the screen information.

FIG. 14 is a conceptual view illustrating a control method of an output area is based on a user's location. The image display apparatus according to this exemplary embodiment may further include a sensing unit (not shown) which is disposed adjacent to the display 170 to sense a user's location. The sensing unit may be implemented as one sensing unit mounted in the image display apparatus. For example, the sensing unit may be implemented as a camera module for acquiring images of a user who is viewing the display 170 and ambient environments and deciding an area where the user is located.

Meantime, the sensing unit may include three sensors disposed adjacent to the plane portion 171 and the first and second bent portions 172a and 172b, respectively. That is, each sensor may sense the user located adjacent thereto.

Referring to FIG. 14A, the sensing unit may sense a user who is located at a central area CA of the display 170, namely, at a location facing the plane portion 171. The controller 150 may control the display 170 to output the screen information 300 on the plane portion 171 based on the user's location sensed by the sensing unit.

Although not shown, the controller 150 may control the display 170 to output the screen information 300 on the plane portion 171 and the first and second bent portions 172a and 172b based on the user's location.

Referring to FIG. 14B, the sensing unit may sense the user's location. When the sensing unit senses that the user is located at a left area AL adjacent to the first bent portion 172a, the controller 150 may control the display 170 to output the screen information 300 on the first bent portion 172a and the plane portion 171.

The controller 150 may control the display 170 to restrict the output on the second bent portion 172b or output another image on the second bent portion 172b.

Referring to FIG. 14C, the sensing unit may sense the user's location. When the sensing unit senses that the user is located at a right area AR adjacent to the second bent portion 172b, the controller 150 may control the display 170 to output the screen information 300 on the second bent portion 172b and the plane portion 171.

The controller 150 may control the display 170 to restrict the output on the first bent portion 172a or output another image on the first bent portion 172a.

In accordance with this exemplary embodiment, as an area for outputting screen information may change according to a location where a user is viewing the screen information, visibility may be more improved.

Figure 15:
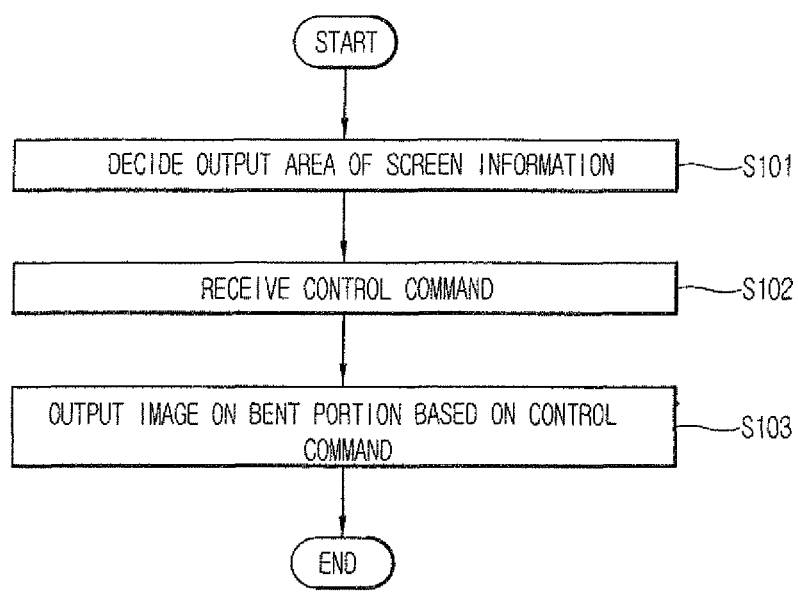
FIG. 15 is a flowchart illustrating a control method for an image display apparatus in accordance with one exemplary embodiment.

FIG. 15 is a flowchart illustrating a control method for an image display apparatus in accordance with one exemplary embodiment.

Referring to FIG. 3 and FIG. 15, the controller 150 of the image display apparatus may decide an output area of screen information 300 (S101). That is, the controller 150 may decide whether to output the screen information only on the plane portion 171 or on the entire display 170.

While the screen information 300 is output on at least one area of the display 170, the controller 150 may receive a control command for controlling the image display apparatus (S102). The controller 150 may control functions of the image display apparatus based on the control command.

For example, the control of the functions of the image display apparatus may include control of sound output through the audio output unit 180, control of the display 170, control of the wireless communication unit (not shown) and the storage unit 160, and the like.

The controller 150 may control the display 170 to output a control image on the bent portion based on the control command (S103).

The control image may be implemented into various shapes based on the control command. The controller may also control the display to deactivate the bent portion.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image display apparatus comprising:
a display having a front surface for outputting screen information and a rear surface opposite to the front surface, and comprising a plane portion and at least one bent portion integrally formed with the plane portion and bent from an edge of the plane portion by a preset angle;
a bezel part formed along edges of the display;
a sensing unit formed adjacent to the display and configured to sense a user's location based on the display; and
a controller configured to
output the screen information on the plane portion when the user's location is facing the plane portion,
resize the screen information when the user's location is adjacent to the at least one bent portion, and
output a portion of the resized screen information on the plane portion and a remaining portion of the resized screen information on the at least one bent portion.

2. The apparatus of claim 1, wherein a front surface of the at least one bent portion is a curved surface or a flat surface.

3. The apparatus of claim 2, further comprising:
a case connected to the bezel part and covering the rear surface of the display; and
a fixing unit protruding from the case to fix the image display apparatus,
wherein the at least one bent portion is bent toward the rear surface of the display, and
wherein a distance from the plane portion to an end of the fixing unit is the same as a distance from the plane portion to an edge of the at least one bent portion.

4. The apparatus of claim 1, wherein a width of the at least one bent portion is less than ⅙ of a width of the plane portion.

5. The apparatus of claim 4, further comprising:
an audio output unit configured to output sound,
wherein the controller is configured to
receive a control command input by a user, and
display a control image corresponding to the sound on the at least one bent portion in response to the input control command.

6. The apparatus of claim 4, wherein the controller is configured to stop displaying the control image on the at least one bent portion in a mute state in which the sound output is muted.

7. The apparatus of claim 4, further comprising:
a microphone configured to sense a user's voice for controlling the display,
wherein the controller is configured to receive a voice control command input by a user, and
display a control image corresponding to the voice control command on the at least one bent portion based on the voice.

8. The apparatus of claim 4, further comprising:
a distance sensing unit formed in the display and configured to sense a distance with a user,
wherein the controller is configured to receive a control command input by a user, and display a control image corresponding to the control command on the display, and
wherein when a part of the screen information is output on the at least one bent portion, the controller is configured to display the control image on the at least one bent portion if the distance with the user is shorter than a preset first distance.

9. The apparatus of claim 4,
wherein the controller is configured to display the control image according to an operation executed based on a preset time.

10. The apparatus of claim 4, further comprising:
a wireless communication unit configured to receive a wireless signal,
wherein the controller is configured to display the control image on the at least one bent portion when a wireless signal is received through the wireless communication unit.

11. The apparatus of claim 5, wherein the control image corresponding to the sound is output in a different shape according to a volume of the sound.

12. The apparatus of claim 7, wherein the plane portion is formed by an upper edge, a lower edge and left and right edges, and the at least one bent portion is formed on the lower edge.

13. The apparatus of claim 12, further comprising:
a touch sensing unit formed in the at least one bent portion and configured to sense a user's touch input,
wherein the controller is configured to display at least one graphic image on the at least one bent portion for receiving the user's touch input.

14. The apparatus of claim 13, further comprising:
a distance sensing unit formed in the display and configured to sense a distance with the user,
wherein the controller is configured to display the graphic image on the at least one bent portion when the distance sensing unit senses that the user is located within a preset range.

15. The apparatus of claim 8, wherein the controller is configured to restrict the display of the screen information on the plane portion when the distance with the user is shorter than a preset second distance.

16. The apparatus of claim 15, further comprising:
an audio output unit configured to output sound corresponding to the screen information,
wherein the controller is configured to display another control image corresponding to a change in the sound on the at least one bent portion.

* * * * *